United States Patent
Ustimenko

(10) Patent No.: US 12,271,826 B2
(45) Date of Patent: Apr. 8, 2025

(54) METHODS AND SYSTEMS FOR TRAINING A DECISION-TREE BASED MACHINE LEARNING ALGORITHM (MLA)

(71) Applicant: YANDEX EUROPE AG, Lucerne (CH)

(72) Inventor: Aleksey Ivanovich Ustimenko, Ivanovo (RU)

(73) Assignee: Y.E. Hub Armenia LLC, Yerevan (AM)

( * ) Notice: Subject to any disclaimer, the term of this patent is extended or adjusted under 35 U.S.C. 154(b) by 859 days.

(21) Appl. No.: 17/207,403

(22) Filed: Mar. 19, 2021

(65) Prior Publication Data
US 2022/0019902 A1 Jan. 20, 2022

(30) Foreign Application Priority Data
Jul. 20, 2020 (RU) .............................. 2020124073

(51) Int. Cl.
*G06N 5/01* (2023.01)
*G06F 16/951* (2019.01)
(Continued)

(52) U.S. Cl.
CPC .............. *G06N 5/01* (2023.01); *G06F 16/951* (2019.01); *G06F 16/9574* (2019.01); *G06F 18/2148* (2023.01); *G06N 20/00* (2019.01)

(58) Field of Classification Search
CPC ...... G06N 5/01; G06N 20/00; G06F 16/9574; G06F 16/951; G06F 18/2148
See application file for complete search history.

(56) References Cited

U.S. PATENT DOCUMENTS

| | | |
|---|---|---|
| 6,725,208 B1 | 4/2004 | Hartman et al. |
| 7,313,550 B2 | 12/2007 | Kulkarni et al. |

(Continued)

FOREIGN PATENT DOCUMENTS

| | | |
|---|---|---|
| RU | 2632143 C1 | 10/2017 |
| WO | 03081527 A1 | 10/2003 |

OTHER PUBLICATIONS

Sukhbaatar et al., "Training Convolutional Networks with Noisy Labels", ICLR 2015, arXiv, Apr. 2015, pp. 1-11.
(Continued)

*Primary Examiner* — Beau D Spratt
(74) *Attorney, Agent, or Firm* — BCF LLP

(57) ABSTRACT

Methods and servers for of training a decision-tree based Machine Learning Algorithm (MLA) are disclosed. During a given training iteration, the method includes generating prediction values using current generated trees, generating estimated gradient values by applying a loss function, generating a first plurality of noisy estimated gradient values based on the estimated gradient values, generating a plurality of noisy candidate trees using the first plurality of noisy estimated gradient values, applying a selection metric to select a target tree amongst the plurality of noisy candidate trees, generating a second plurality of noisy estimated gradient values based on the plurality of estimated gradient values, generating an iteration-specific tree based on the target tree and the second plurality of noisy estimated gradient values, and storing, the iteration-specific tree to be used in combination with the current generated trees.

18 Claims, 7 Drawing Sheets

(51) Int. Cl.
  *G06F 16/957* (2019.01)
  *G06F 18/214* (2023.01)
  *G06N 20/00* (2019.01)

(56) References Cited

U.S. PATENT DOCUMENTS

| | | | |
|---|---|---|---|
| 7,472,096 | B2 | 12/2008 | Burges et al. |
| 7,558,764 | B2 | 7/2009 | Abe et al. |
| 8,275,721 | B2 | 9/2012 | Abe et al. |
| 10,510,002 | B1 | 12/2019 | Olabiyi et al. |
| 10,510,003 | B1* | 12/2019 | Olabiyi ................. G06N 3/044 |
| 10,963,814 | B2* | 3/2021 | Gupta ................... G06N 20/00 |
| 2006/0195440 | A1 | 8/2006 | Burges et al. |
| 2007/0094171 | A1 | 4/2007 | Burges et al. |
| 2009/0006360 | A1 | 1/2009 | Liao et al. |
| 2017/0097936 | A1 | 4/2017 | Glover |
| 2017/0293859 | A1 | 10/2017 | Gusev et al. |
| 2017/0364810 | A1 | 12/2017 | Gusev et al. |
| 2018/0121730 | A1 | 5/2018 | Li |
| 2018/0225291 | A1 | 8/2018 | Balinsky et al. |
| 2019/0212977 | A1* | 7/2019 | Sicurelli, III ............ G06F 7/08 |
| 2019/0303795 | A1* | 10/2019 | Khiari ..................... G06N 5/01 |
| 2020/0401149 | A1 | 12/2020 | Gong et al. |
| 2021/0201112 | A1 | 7/2021 | Gauthier Melançon et al. |
| 2021/0374553 | A1* | 12/2021 | Li .......................... G06N 3/088 |

OTHER PUBLICATIONS

Agarwal et al., "Counterfactual Learning-to-Rank for Additive Metrics and Deep Models", https://www.cs.cornell.edu/people/tj/publications/agarwal_etal_18b.pdf, 10 pages.

Sukhbaatar et al., "Learning from Noisy Labels with Deep Neural Networks", Computer Science, Artificial Intelligence, Evolutionary Computing, arXiv, Jun. 2014, pp. 1-10.

Viegas da Silva et al., "PCA and Gaussian noise in MLP neural network training improve generalization in problems with small and unbalanced data sets", The 2011 International Joint Conference on Neural Networks, USA, 2011, pp. 2664-2669.

Ustimenko et al., "SGLB: Stochastic Gradient Langevin Boosting", Yandex.Research, Moscow, Russia, Computer Science > Machine Learning, 2020, https://arxiv.org/abs/2001.07248v2, 10 pages.

Friedman, "Stochastic Gradient Boosting", 1999, pp. 1-10.

"CatBoost is a high-performance open source library for gradient boosting on decision trees", https://catboost.ai accessed on Jan. 26, 2021, pdf 5 pages.

Chen et al., "Accelerating Nonconvex Learning Via Replica Exchange Langevin Diffusion", Published as a conference paper at ICLR 2019, pp. 1-23.

Ge et al., "Escaping From Saddle Points—Online Stochastic Gradient for Tensor Decomposition", Computer Science > Machine Learning, 2015, https://arxiv.org/abs/1503.02101v1, pp. 1-46.

Xu et al., "Global Convergence of Langevin Dynamics Based Algorithms for Nonconvex Optimization", Statistics > Machine Learning, 2020, https://arxiv.org/abs/1707.06618, pp. 1-36.

Welling et al., "Bayesian Learning via Stochastic Gradient Langevin Dynamics", Proceedings of the 28 th International Conference on Machine Learning, USA, 2011, pp. 1-8.

Ahn, "Bayesian Posterior Sampling via Stochastic Gradient Fisher Scoring", Proceedings of the 29 th International Conference on Machine Learning, UK, 2012, pp. 1-8.

Kamalaruban et al., "Reinforcement Learning with Langevin Dynamics", Optimization Foundations for Reinforcement Learning Workshop at NeurIPS, Vancouver, 2019, 8 pages.

Zhang et al., "A Hitting Time Analysis of Stochastic Gradient Langevin Dynamics", arXiv:1702.05575v3, 2018, pp. 1-44.

Patterson et al., "Stochastic Gradient Riemannian Langevin Dynamics on the Probability Simplex", Advances in Neural Information Processing Systems, 2013, pp. 1-9.

Mou et al., "Generalization Bounds of SGLD for Non-convex Learning: Two Theoretical Viewpoints", Computer Science > Machine Learning, 2017, aarXiv.org > cs > arXiv:1707.05947, 2017, pp. 1-29.

Zou et al., "Subsampled Stochastic Variance-Reduced Gradient Langevin Dynamics", Mathematics, Computer Science, 2018, 11 pages.

Wang, "Quadratic Majorization for Nonconvex Loss with Applications to the Boosting Algorithm", Journal of Computational and Graphical Statistics, 2018, pp. 1-41.

Wang et al., "Gradient Boosting", MachineLearning, 2020, pp. 1-30.

Liu et al., "Stochastic Non-convex Optimization with Strong High Probability Second-order Convergence", Mathematics > Optimization and Control, arXiv:1710.09447v2, 2017, pp. 1-8.

Raginsky et al., "Non-Convex Learning via Stochastic Gradient Langevin Dynamics: A Nonasymptotic Analysis", arXiv:1702.03849v3 [cs.LG], 2017, 30 pages.

Matias Valdenegro-Toro, "Deep Sub-Ensembles for Fast Uncertainty Estimation in Image Classification", Published on Nov. 29, 2019, 7 pages, arXiv:1910.08168v2 [cs.LG].

Office Action issued on Sep. 6, 2024 in respect of the related U.S. Appl. No. 17/351,719.

Bruch et al., "A Stochastic Treatment of Learning to Rank Scoring Functions", Published on Jan. 22, 2020, pp. 61-69, https://doi.org/10.1145/3336191.3371844.

Gulin et al., "Winning The Transfer Learning Track of Yahoo!'s Learning To Rank Challenge with YetiRank", JMLR: Workshop and Conference Proceedings: 14 (2011), pp. 63-76, Yahoo! Learning to Rank Challenge.

Office Action issued on Aug. 28, 2024 in respect of the related U.S. Appl. No. 17/223,680.

Russian Search Report dated Jul. 14, 2022 issued in respect of the related Russian Patent Application No. RU 2020113384.

Wickstrom et al. "Uncertainty-Aware Deep Ensembles for Reliable and Explainable Predictions of Clinical Time Series", Published on Oct. 16, 2020, arXiv:2010.11310v1 [cs.LG].

Zeldes "Using Uncertainty to Interpret your Model", article published on Nov. 8, 2018, retrieved on Jan. 6, 2025, https://www.datasciencecentral.com/using-uncertainty-to-interpret-your-model/.

Office Action issued on Dec. 27, 2024 in respect of the related U.S. Appl. No. 17/351,719.

* cited by examiner though the user may not have expressly
METHODS AND SYSTEMS FOR TRAINING A DECISION-TREE BASED MACHINE LEARNING ALGORITHM (MLA)

CROSS-REFERENCE

The present application claims priority to Russian Patent Application No. 2020124073, filed on Jul. 20, 2020, the entirety of which is incorporated herein by reference.

FIELD

The present technology relates to systems and methods for generating machine-learning models. In particular, the present technology is directed to a method of and a system for training a decision-tree based Machine Learning Algorithm.

BACKGROUND

Machine learning algorithms (MLAs) are used to address multiple needs in computer-implemented technologies. Typically, the MLAs are used for generating a prediction based on data provided thereto.

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query.

In the search engine example, the MLA is used for generating the ranked search results. When the user submits a search query, the search engine generates a list of relevant web resources (based on an analysis of crawled web resources, an indication of which is stored in a crawler database in a form of posting lists or the like). The search engine then executes the MLA to rank the so-generated list of search results. The MLA ranks the list of search results based on their relevancy to the search query. Such the MLA is "trained" to predict relevancy of the given search result to the search query based on a plethora of "features" associated with the given search result, as well as indications of past users' interactions with search results when submitting similar search queries in the past.

As has been alluded to above, the search engines are useful when the user knows what the user is looking for (i.e. has a particular search intent in mind). There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD™ recommendation system, which system aggregates and recommends content from various social networks. The FLIPBOARD recommendation system presents the uncovered content in a "magazine style" format, where the user can "flip" through the pages with the recommended/aggregated content. The recommendation system collects content from social media and other websites, presents it in magazine format, and allows users to "flip" through their social-networking feeds and feeds from websites that have partnered with the company, effectively "recommending" content to the user even expressed her/his desire in the particular content. Another example of a recommendation system is YANDEX.ZEN™ recommendation system, which generates and presents user-personalized content to the user when the user initiates an application associated with Yandex.Zen, which can be a dedicated application or a landing page of a browser application.

In order to generate the ranked search results in a search engine system or a list of recommended resources in a typical recommendation system, the respective system utilizes the MLA the recommended content from various content sources available on the Internet. There are many different types of MLAs known in the art. Broadly speaking, there are three types of MLAs: supervised learning based MLAs, unsupervised learning based MLAs and reinforcement learning based MLAs.

One example of supervised learning MLAs are Decision-tree models. This type of MLAs uses a decision tree to go from observations about an item (represented in the branches) to conclusions about the item's target value (represented in the leaves). Tree models where the target variable can take a discrete set of values are called classification trees; in these tree structures, leaves represent class labels and branches represent conjunctions of features that lead to those class labels. Decision trees where the target variable can take continuous values (typically real numbers) are called regression trees.

In order for the decision-tree based MLA to work, it needs to be "built" or trained using a training set of objects containing a large plurality of training objects (such as documents, events, or the like).

SUMMARY

Embodiments of the present technology have been developed based on developers' appreciation of at least one technical problem associated with the prior art approaches to building decision trees.

Developers of the present technology have identified one or more drawbacks of a "Gradient Boosting" (GB) method for building a decision-tree Machine Learning Algorithm (MLA). Broadly speaking, GB is a powerful machine-learning method that iteratively combines weak models to obtain more accurate ones. Nowadays, this machine-learning technique is one of the most common ones for training MLAs used for web search, recommendation systems, weather forecasting, and many other problems with complex dependencies and heterogeneous data.

One variant of this machine-learning technique is called "Stochastic Gradient Boosting" (SGB), where during each training iteration, a subset of training objects is randomly chosen for building a tree during that training iteration. Additional information regarding the implementation of the GB and SGB techniques can be found in an article, entitled "Stochastic Gradient Boosting", published on Mar. 26, 1999, by Jerome H. Friedman, the contents of which are incorporated herein by reference in its entirety.

In at least some embodiments of the present technology, developers of the present technology have devised methods and systems for implementing a globally convergent algorithm for convex, as well as non-convex optimization. In other words, some embodiments of the present technology allow building an GB-type algorithm that is able to converge to a global minimum of convex, as well as non-convex loss-functions. It should be noted that one of the differences between convex and non-convex loss functions is that the latter ones have stationary points such as local minimums or also known as "saddle points". In contrast, a stationary point in a convex function is a global minimum thereof.

In typical GB algorithms, a decision-tree based MLA can be built to make predictions that yield a lower value of a loss function. It can be said that conventional GB allows creating an additional tree with each training iteration such that it results, in a sense, in "travelling" along a given loss function towards a lower value thereof. When performing convex optimization (using a convex loss function), using GB results in "travelling" towards the global minimum of that convex loss function. However, when performing non-convex optimization (using a non-convex loss function), it may not always be the case that using SGB will result in "travelling" towards the global minimum, but rather towards a local minimum (saddle point).

For this purpose, it can be said that the developers of the present technology have devised methods and systems where GB is used in combination with stochastic gradient Langevin dynamics—i.e., it can be said that the developers of the present technology have devised a modified SGB technique herein referred to as Stochastic Gradient Langevin Boosting (SGLB).

In some embodiments of the present technology, when the SGLB technique is used, at a respective training iteration, predictions may be shrunk and noise is added in a particular manner to generate stochastic estimated gradient values. In some embodiments of the present technology, this modified gradient boosting technique can be implemented as a part of the CatBoost library. The CatBoost library and additional information regarding gradient boosting algorithms is available at https://catboost.ai. Thus it can be said, at least some embodiments of the present technology can be implemented in accordance with the CatBoost framework.

In at least some embodiments of the present technology, it is contemplated that the manner in which noise is injected during the training phase of the decision-tree based MLA in accordance with the SGLB algorithm disclosed herein allows, in a sense, "jumping" between different saddles of a non-convex loss function. Hence, subsequent training iterations may not necessarily "travel" towards a same potentially local minimum, and instead, will generally "travel" towards lower values of the non-convex loss function. Therefore, in at least some embodiments of the present technology, the SGLB algorithm enables both exploitation and exploration of data during training so as to globally converge even if employed with a non-convex loss function.

In a first broad aspect of the present technology, there is provided a method of training a decision-tree based Machine Learning Algorithm (MLA). The decision-tree based MLA is based on a plurality of generated trees. A given one from the plurality of generated trees has a respective plurality of leaf nodes having respective leaf values. The method is executable by a server having access to a training dataset. The training dataset comprises a plurality of training objects and a plurality of target values. A given one of the plurality of target values is indicative of a ground-truth associated with a given one of the plurality of training objects. The method comprises, during a given training iteration of the decision-tree based MLA, generating, by the server, a plurality of prediction values using a current plurality of generated trees. A given one from the plurality of prediction values is indicative of an output generated by the current plurality of generated trees for the target value of the respective one of the plurality of training objects. The method comprises, during a given training iteration of the decision-tree based MLA, generating, by the server, a plurality of estimated gradient values by applying a loss function. A given one from the plurality of estimated gradient values is indicative of a difference between the target value and the respective one of the plurality of prediction values. The method comprises, during a given training iteration of the decision-tree based MLA, generating, by the server, a first plurality of noisy estimated gradient values by applying a first noise-injecting function onto the plurality of estimated gradient values. The method comprises, during a given training iteration of the decision-tree based MLA, generating, by the server, a plurality of noisy candidate trees using the first plurality of noisy estimated gradient values. A given one of the plurality of noisy candidate trees having a respective plurality of leaf nodes with respective leaf values. The respective leaf values are based on the first plurality of noisy estimated gradient values. The method comprises, during a given training iteration of the decision-tree based MLA, applying, by the server, a selection metric to the leaf values of the plurality of noisy candidate trees to select a target tree amongst the plurality of noisy candidate trees. The target tree is a given noisy candidate tree having leaf values that are closest to respective noisy estimated gradient values from the first plurality of noisy estimated gradient values than leaf values of any other noisy candidate tree. The method comprises, during a given training iteration of the decision-tree based MLA, generating, by the server, a second plurality of noisy estimated gradient values by applying a second noise-injecting function onto the plurality of estimated gradient values. The method comprises, during a given training iteration of the decision-tree based MLA, generating, by the server, an iteration-specific tree by determining new leaf values for respective leaf nodes of the target tree. The new leaf values are determined based on the second plurality of noisy estimated gradient values. The method comprises, during a given training iteration of the decision-tree based MLA, storing, by the server, the iteration-specific tree to be used, by the server, in combination with the current plurality of generated trees.

In some embodiments of the method, the decision-tree based MLA is being trained for performing one of a regression task and a classification task during an in-use phase of the decision-tree based MLA.

In some embodiments of the method, the loss function if one of a convex loss function and a non-convex loss function.

In some embodiments of the method, the non-convex loss function includes a 0-1 loss function.

In some embodiments of the method, the first noise-inducing function is:

$$\zeta_i = \mathcal{N}(0, 2\epsilon\beta^{-1})$$

wherein: $\zeta_i$ is a given noise value to be added to $i^{th}$ estimated gradient value from the plurality of estimated gradient values to generate the $i^{th}$ noisy estimated gradient value from the first plurality of noisy estimated gradient values, $\mathcal{N}$ ("mean", "variance") is a normal distribution function, $\epsilon$ is a learning rate parameter, $\beta$ is an inverse Langevin diffusion temperature parameter.

In some embodiments of the method, the generating the plurality of noisy candidate trees comprises generating, by the server, the given one of the plurality of noisy candidate trees by: determining, by the server, a tree structure for the given one of the plurality of noisy candidate trees based on the first plurality of noisy estimated gradient values, and where the tree structure has the respective plurality of leaf nodes each of which corresponds to at least one of the first plurality of noisy estimated gradient values. For a given leaf node corresponding to more than one of the first plurality of noisy estimated gradient values, the determining the tree structure comprises aggregating, by the server, the more than one of the first plurality of noisy estimated gradient values, thereby determining an aggregated value, and using the aggregated value as the respective leaf value of the given leaf node. For an other given leaf node of the respective plurality of leaf nodes corresponding to only one of the first plurality of noisy estimated gradient values, the determining the tree structure comprises using the only one of the first plurality of noisy estimated gradient values as the respective leaf value.

In some embodiments of the method, the selection metric is a sum of squared differences between the leaf values of a given noisy candidate tree and the corresponding estimated gradient values from the first plurality of estimated gradient values.

In some embodiments of the method, the second noise-inducing function is:

$$\zeta_i' = \mathcal{N}(0, 2\epsilon\beta^{-1})$$

wherein: $\zeta_i'$ is a given noise value to be added to $i^{th}$ estimated gradient value from the plurality of estimated gradient values to generate the $i^{th}$ noisy estimated gradient value from the second plurality of noisy estimated gradient values, $\mathcal{N}$ ("mean", "variance") is a normal distribution function, $\epsilon$ is a learning rate parameter, $\beta$ is an inverse Langevin diffusion temperature parameter.

In some embodiments of the method, the first noise-inducing function is independent from the second noise-inducing function.

In some embodiments of the method, the first plurality of noisy estimated gradient values are generated independently from the second plurality of noisy estimated gradient values.

In some embodiments of the method, the generating the iteration-specific tree comprises, for a given leaf node of the target tree corresponding to more than one of the second plurality of noisy estimated gradient values, aggregating, by the server, the more than one of the second plurality of noisy estimated gradient values, thereby determining an aggregated value, and using the aggregated value as the new leaf value of the given leaf node. The generating the iteration-specific tree comprises, for an other given leaf node of the target tree corresponding to only one of the second plurality of noisy estimated gradient values, using the only one of the second plurality of noisy estimated gradient values to be used as the new leaf value of the other given leaf node.

In some embodiments of the method, during the given training iteration, the method further comprises, executing, by the server, a shrinkage procedure on the plurality of prediction values by using a shrinkage parameter for generating a plurality of shrunk prediction values, where a given shrunk prediction value is smaller than the respective prediction value. The given one from the plurality of estimated gradient values is indicative of a difference between the target value and a respective one of the plurality of shrunk prediction values.

In some embodiments of the method, the using the iteration-specific tree in combination with the current plurality of generated trees comprises executing, by the server, a regularization procedure on the new leaf values of the iteration-specific tree by using a learning rate parameter for generating a plurality of regularized leaf values, where a given regularized leaf value is smaller than the respective leaf value, and using, by the server, the iteration-specific tree with the plurality of regularized leaf values and the current plurality of generated trees during the next training iteration of the decision-tree based MLA.

In a second broad aspect of the present technology, there is provided a server for training a decision-tree based Machine Learning Algorithm (MLA). The decision-tree based MLA is based on a plurality of generated trees. A given one from the plurality of generated trees has a respective plurality of leaf nodes having respective leaf values. The server has access to a training dataset. The training dataset comprises a plurality of training objects and a plurality of target values. A given one of the plurality of target values is indicative of a ground-truth associated with a given one of the plurality of training objects. The server is configured to, during a given training iteration of the decision-tree based MLA, generate a plurality of prediction values using a current plurality of generated trees. A given one from the plurality of prediction values is indicative of an output generated by the current plurality of generated trees for the target value of the respective one of the plurality of training objects. The server is configured to, during a given training iteration of the decision-tree based MLA, generate a plurality of estimated gradient values by applying a loss function. A given one from the plurality of estimated gradient values is indicative of a difference between the target value and the respective one of the plurality of prediction values. The server is configured to, during a given training iteration of the decision-tree based MLA, generate a first plurality of noisy estimated gradient values by applying a first noise-injecting function onto the plurality of estimated gradient values. The server is configured to, during a given training iteration of the decision-tree based MLA, generate a plurality of noisy candidate trees using the first plurality of noisy estimated gradient values. A given one of the plurality of noisy candidate trees has a respective plurality of leaf nodes with respective leaf values, the respective leaf values are based on the first plurality of noisy estimated gradient values. The server is configured to, during a given training iteration of the decision-tree based MLA, apply a selection metric to the leaf values of the plurality of noisy candidate trees to select a target tree amongst the plurality of noisy candidate trees. The target tree is a given noisy candidate tree having leaf values that are closest to respective noisy estimated gradient values from the first plurality of noisy estimated gradient values than leaf values of any other noisy candidate tree. The server is configured to, during a given training iteration of the decision-tree based MLA, generate a second plurality of noisy estimated gradient values by applying a second noise-injecting function onto the plurality of estimated gradient values. The server is configured to, during a given training iteration of the decision-tree based MLA, generate an iteration-specific tree by determining new leaf values for respective leaf nodes of the target tree. The new leaf values are determined based on the second plurality of noisy estimated gradient values. The server is configured to, during a given training iteration of the decision-tree based MLA, store the iteration-specific tree to be used, by the server, in combination with the current plurality of generated trees.

In some embodiments of the server, the decision-tree based MLA is being trained for performing one of a regression task and a classification task during an in-use phase of the decision-tree based MLA.

In some embodiments of the server, the loss function if one of a convex loss function and a non-convex loss function.

In some embodiments of the server, the non-convex loss function includes a 0-1 loss function.

In some embodiments of the server, the first noise-inducing function is:

$$\zeta_i = \mathcal{N}(0, 2\epsilon\beta^{-1})$$

wherein: $\zeta_i$ is a given noise value to be added to $i^{th}$ estimated gradient value from the plurality of estimated gradient values to generate the $i^{th}$ noisy estimated gradient value from the first plurality of noisy estimated gradient values, $\mathcal{N}$ ("mean", "variance") is a normal distribution function, $\epsilon$ is a learning rate parameter, $\beta$ is an inverse Langevin diffusion temperature parameter.

In some embodiments of the server, the server configured to generate the plurality of noisy candidate trees comprises the server configured to generate the given one of the plurality of noisy candidate trees by determining, by the server, a tree structure for the given one of the plurality of noisy candidate trees based on the first plurality of noisy estimated gradient values. The tree structure has the respective plurality of leaf nodes each of which corresponds to at least one of the first plurality of noisy estimated gradient values. The server configured to determine the tree structure is configured to, for a given leaf node corresponding to more than one of the first plurality of noisy estimated gradient values, aggregate the more than one of the first plurality of noisy estimated gradient values, thereby determining an aggregated value, and use the aggregated value as the respective leaf value of the given leaf node. The server configured to determine is configured to, for an other given leaf node of the respective plurality of leaf nodes corresponding to only one of the first plurality of noisy estimated gradient values, use the only one of the first plurality of noisy estimated gradient values as the respective leaf value.

In some embodiments of the server, the selection metric is a sum of squared differences between the leaf values of a given noisy candidate tree and the corresponding estimated gradient values from the first plurality of estimated gradient values.

In some embodiments of the server, the second noise-inducing function is:

$$\zeta_i' = \mathcal{N}(0, 2\epsilon\beta^{-1})$$

wherein: $\zeta_i'$ is a given noise value to be added to $i^{th}$ estimated gradient value from the plurality of estimated gradient values to generate the $i^{th}$ noisy estimated gradient value from the second plurality of noisy estimated gradient values, $\mathcal{N}$ ("mean", "variance") is a normal distribution function, $\epsilon$ is a learning rate parameter, $\beta$ is an inverse Langevin diffusion temperature parameter.

In some embodiments of the server, the first noise-inducing function is independent from the second noise-inducing function.

In some embodiments of the server, the first plurality of noisy estimated gradient values are generated independently from the second plurality of noisy estimated gradient values.

In some embodiments of the server, the server configured to generate the iteration-specific tree comprises the server configured to, for a given leaf node of the target tree corresponding to more than one of the second plurality of noisy estimated gradient values, aggregate the more than one of the second plurality of noisy estimated gradient values, thereby determine an aggregated value, and use the aggregated value as the new leaf value of the given leaf node. The server is configured to, for an other given leaf node of the target tree corresponding to only one of the second plurality of noisy estimated gradient values, use the only one of the second plurality of noisy estimated gradient values to be used as the new leaf value of the other given leaf node.

In some embodiments of the server, during the given training iteration, the server is further configured to execute a shrinkage procedure on the plurality of prediction values by using a shrinkage parameter for generating a plurality of shrunk prediction values, where a given shrunk prediction value is smaller than the respective prediction value. The given one from the plurality of estimated gradient values is indicative of a difference between the target value and a respective one of the plurality of shrunk prediction values.

In some embodiments of the server, the server configured to use the iteration-specific tree in combination with the current plurality of generated trees comprises the server configured to execute a regularization procedure on the new leaf values of the iteration-specific tree by using a learning rate parameter for generating a plurality of regularized leaf values, where a given regularized leaf value is smaller than the respective leaf value, and use the iteration-specific tree with the plurality of regularized leaf values and the current plurality of generated trees during the next training iteration of the decision-tree based MLA.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
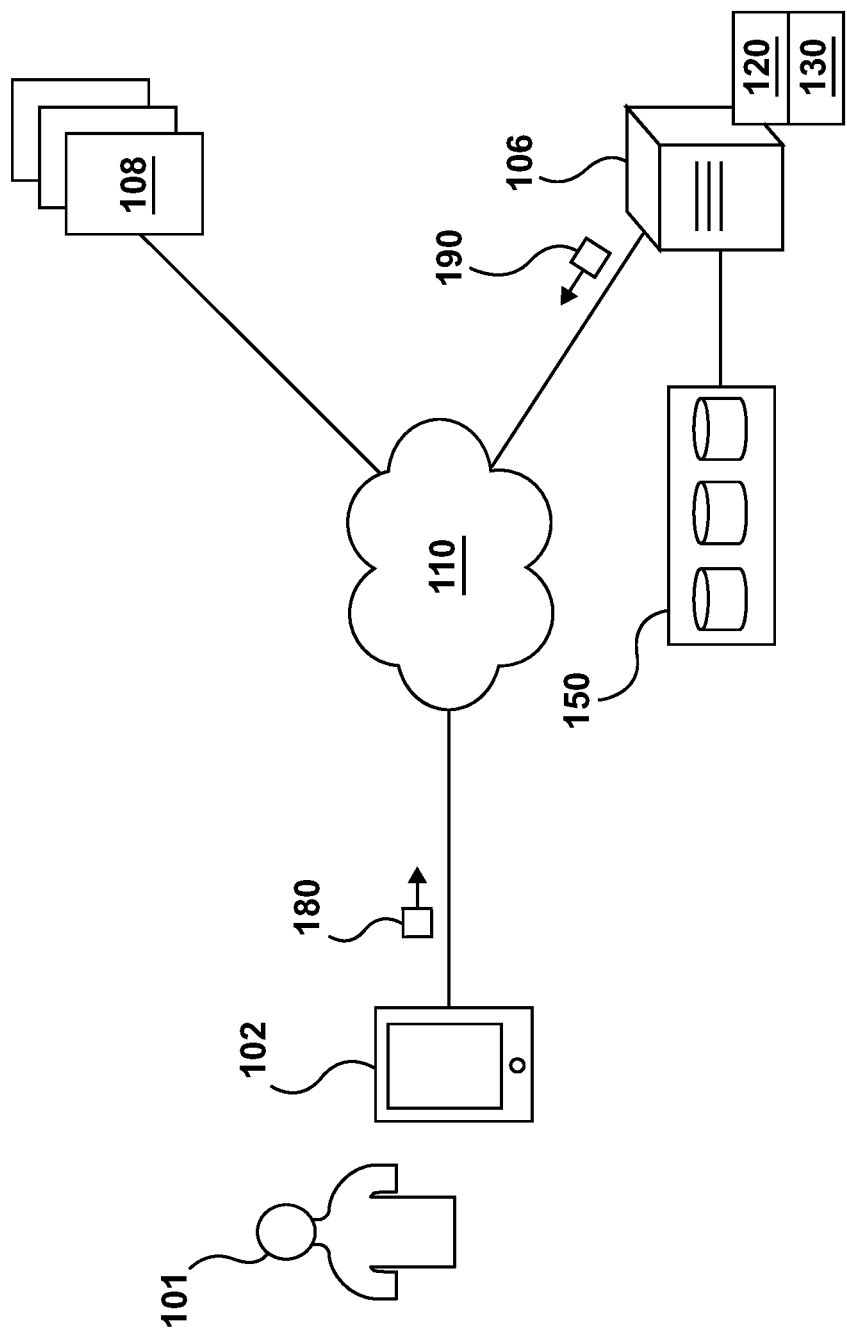
FIG. 1 is a schematic illustration of a system as in accordance to at least some non-limiting embodiments of the present technology.

An Appendix A is provided at the end of the present specification. The Appendix A includes a copy of a yet to be published article entitled "SGLB: Stochastic Gradient Langevin Boosting". This article provides additional background information, description of implementations of the non-limiting embodiments of the present technology, as well as some additional examples. The entirety of this article is incorporated herein by reference in their entirety, in all those jurisdictions where such incorporation by reference is allowed.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology.

Broadly speaking and as an example, the system 100 may be employed for providing search results to a given user in response to a query submitted thereby. To that end, the system 100 comprises inter alia an electronic device 102 associated with the user 101, a server 106, a plurality of resource servers 108 and a database system 150. For example, the user 101 may submit a given query via the electronic device 102 to the server 106 which, in response, is configured to provide search results to the user 101. The server 106 generates these search results based on information that has been retrieved from, for example, the plurality of resource servers 108 and stored in the database system 150. These search results provided by the system 100 may be relevant to the submitted query. It should be noted that the system 100 can be configured as another type of a computer-based platform, such as a recommendation system, a classification system, or the like. Some functionality of components of the system 100 will now be described in greater detail.

Electronic Device

As mentioned above, the system 100 comprises the electronic device 102 associated with the user 101. As such, the electronic device 102, or simply "device" 102 can sometimes be referred to as a "client device", "end user device" or "client electronic device". It should be noted that the fact that the electronic device 102 is associated with the user 101 does not need to suggest or imply any mode of operation—such as a need to log in, a need to be registered, or the like.

In the context of the present specification, unless provided expressly otherwise, "electronic device" or "device" is any computer hardware that is capable of running a software appropriate to the relevant task at hand. Thus, some non-limiting examples of the device 102 include personal computers (desktops, laptops, netbooks, etc.), smartphones, tablets and the like. The device 102 comprises hardware and/or software and/or firmware (or a combination thereof), as is known in the art, to execute a given browser application (not depicted).

Generally speaking, the purpose of the given browser application is to enable the user 101 to access one or more web resources. How the given browser application is implemented is not particularly limited. One example of the given browser application that is executable by the device 102 may be embodied as a Yandex™ browser. For example, the user 101 may use the given browser application to (i) navigate to a given search engine website, and (ii) submit a query in response to which (s)he is to be provided with relevant search results.

The device 102 is configured to generate a request 180 in response to the user 101 submitting a query. The request 180 may take form of one or more data packets comprising information indicative of the query submitted by the user 101. The device 102 is also configured to receive a response 190. The response 190 may take form of one or more data packets comprising information indicative of search results that are relevant to the submitted query and computer-readable instructions for displaying by the given browser application to the user 101 these search results. How the content of the response 190 is generated in response to the submitted query will be described in greater details herein further below.

Communication Network

The system 100 comprises a communication network 110. In one non-limiting example, the communication network 110 may be implemented as the Internet. In other non-limiting examples, the communication network 110 may be implemented differently, such as any wide-area communication network, local-area communication network, a private communication network and the like. In fact, how the communication network 110 is implemented is not limiting and will depend on inter alia how other components of the system 100 are implemented.

The purpose of the communication network 110 is to communicatively couple at least some of the components of the system 100 such as the device 102, the plurality of resource servers 108 and the server 106. For example, this means that the plurality of resource servers 108 is accessible via the communication network 110 by the device 102. In another example, this means that the plurality of resource servers 108 is accessible via the communication network 110 by the server 106. In a further example, this means that the server 106 is accessible via the communication network 110 by the device 102.

The communication network 110 may be used in order to transmit data packets amongst the device 102, the plurality of resource servers 108 and the server 106. For example, the communication network 110 may be used to transmit the request 180 from the device 102 to the server 106. In another example, the communication network 110 may be used to transmit the response 190 from the server 106 to the device 102.

Plurality of Resource Servers

As mentioned above, the plurality of resource servers 108 can be accessed via the communication network 110. The plurality of resource servers 108 may be implemented as conventional computer servers. In a non-limiting example of an embodiment of the present technology, a given one of the plurality of resource servers 108 may be implemented as a Dell™ PowerEdge™ Server running the Microsoft™ Windows Server™ operating system. The given one of the plurality of resource servers 108 may also be implemented in any other suitable hardware and/or software and/or firmware or a combination thereof.

The plurality of resource servers 108 are configured to host (web) resources that can be accessed by the device 102 and/or by the server 106. Which type of resources the plurality of resource servers 108 is hosting is not limiting. However, in some embodiments of the present technology, the resources may comprise digital documents, or simply "documents", that are representative of web pages.

For example, the plurality of resource servers 108 may host web pages, which means that the plurality of resource servers 108 may store documents representative of web pages and which are accessible by the device 102 and/or by the server 106. A given document may be written in a mark-up language and may comprise inter alia (i) content of a respective web page and (ii) computer-readable instructions for displaying the respective web page (content thereof).

A given one of the plurality of resource servers 108 may be accessed by the device 102 in order to retrieve a given document stored on the given one of the plurality of resource servers 108. For example, the user 101 may enter a web address associated with a given web page in the given browser application of the device 102 and, in response, the device 102 may access a given resource server hosting the given web page in order to retrieve the document representative of the given web page for rendering the content of the web page via the given browser application.

A given one of the plurality of resource servers 108 may be accessed by the server 106 in order to retrieve a given document stored on the given one of the plurality of resource servers 108. The purpose for the server 106 accessing and retrieving documents from the plurality of resource servers 108 will be described in greater detail herein further below.

Database System

The server 106 is communicatively coupled to the database system 150. Generally speaking, the database system 150 is configured to acquire data from the server 106, store the data, and/or provide the data to the server 106 for further use.

In some embodiments, the database system 150 may be configured to store information associated with a search engine hosted by the server 106. For example, the database system 150 may store information about previously performed searches by the search engine. Also, the database system 150 may store information about previously submitted queries to the server 106 and about documents that have been provided by the search engine of the server 106 as search results. As it will become apparent from the description herein further below, the database system 150 may also be configured to store an indexing structure to be used by the search engine of the server 106, such as an inverted index including term-specific posting lists of documents that contain the respective search terms.

It is contemplated that the database system 150 may store query data associated with respective queries submitted to the search engine. Query data associated with a given query may be of different types and is not limiting. For example, the database system 150 may store query data for respective queries such as, but not limited to:

popularity of a given query;
frequency of submission of the given query;
number of clicks associated with the given query;
indications of other submitted queries associated with the given query;
indications of documents associated with the given query;
other statistical data associated with the given query;
search terms associated with the given query;
number of characters within the given query; and
other query-intrinsic characteristics of the given query.

The database system 150 may also store document data associated with respective documents. Document data associated with a given document may be of different types and is not limiting. For example, the database system 150 may store document data for respective documents such as, but not limited to:

popularity of a given document;
click-through-rate for the given document;
time-per-click associated with the given document;
indications of queries associated with the given document;
other statistical data associated with the given document;
text associated with the given document;
file size of the given document; and
other document-intrinsic characteristics of the given document.

In at least some embodiments, it is contemplated that the database system 150 may be configured to store data in association with "document-query" pairs. For example, the database system 150 may be configured to store a list of documents in association with one or more queries for which they have been provided as search results by the search engine.

Furthermore, it is contemplated that the database system 150 may be configured to store label data associated with a given document and/or with a given document-query pair. Broadly speaking, label data contains information indicative of "ground-truth" about a respective document and/or a respective document-query pair. For example, label data associated with a given document may be indicative of whether the given document is a news article or a scientific article. In another example, label data associated with a given document-query pair may be indicative of a relevance of the respective document to the respective query from the given document-query pair (for example, in a form of a click/no click information).

How label data is collected and/or generated and then stored in the database system 150 is not particularly limiting. In some cases, label data may be collected from human assessors that have been tasked with "labelling" documents and/or document-query pairs. In other cases, label data may be generated by one or more computer-implemented procedures executed by the server 106 (i.e., machine-generated data), without departing from the scope of the present technology.

Server

The system 100 comprises the server 106 that may be implemented as a conventional computer server. In an example of an embodiment of the present technology, the server 106 may be implemented as a Dell™ PowerEdge™ Server running the Microsoft™ Windows Server™ operating system. Needless to say, the server 106 may be implemented in any other suitable hardware and/or software and/or firmware or a combination thereof. In the depicted non-limiting embodiment of present technology, the server 106 is a single server. In alternative non-limiting embodiments of the present technology, the functionality of the server 106 may be distributed and may be implemented via multiple servers.

Generally speaking, the server 106 is under control and/or management of a search engine provider (not depicted) such as, for example, an operator of the Yandex™ search engine. As such, the server 106 may be configured to host a given search engine for performing one or more searches responsive to queries submitted by users of the given search engine.

For example, the server 106 may receive the request 180 from device 102 indicative of the query submitted by the user 101. The server 106 may perform a search responsive to the submitted query for generating search results that are relevant to the submitted query. As a result, the server 106 may be configured to generate the response 190 indicative of the search results and may transmit the response 190 to the device 102 for display of the search results to the user 101 via the given browser application, for example.

The search results generated for the submitted query may take many forms. However, in one non-limiting example of the present technology, the search results generated by the server 106 may be indicative of documents that are relevant to the submitted query. How the server 106 is configured to determine and retrieve documents that are relevant to the submitted query will become apparent from the description herein.

The server 106 may also configured to execute a crawler application 120. Broadly speaking, the crawler application 120 may be used by the server 106 in order to "visit" resources accessible via the communication network 110 and to retrieve/download them for further use. For example, the crawler application 120 may be used by the server 106 in order to access the plurality of resource servers 108 and to retrieve/download documents representative of web pages hosted by the plurality of resource servers 108.

It is contemplated that the crawler application 120 may be periodically executable by the server 106 in order to retrieve/download documents that have been updated and/or became accessible over the communication network 110 since a previous execution of the crawler application 120.

In the context of the present technology, the server 106 is configured to employ one or more Machine Learning Algorithms (MLAs) for supporting a variety of search engine services. In at least some embodiments of the present technology, the server 106 is configured to execute a decision-tree based MLA 130. Broadly speaking, a given decision-tree based MLA is a machine learning model having one or more "decision trees" that are used (i) to go from observations about an object (represented in the branches) to conclusions about the object's target value (represented in the leaves). It should be noted that the decision-tree based MLA 130 may be used by the server 106 for performing a variety of tasks that depend on inter alia specific implementations of the present technology.

In some cases, the decision-tree based MLA 130 may be trained to determine, during in-use, a prediction value for a given object which is one of a discrete set of prediction values. For example, some decision-tree MLAs may be trained to determine, during in-use for a given document, whether the given document is a news article or a scientific article. In these cases, such decision-tree MLAs can be referred to as "classification" tree MLAs, since they are trained to perform a classification task on a given object. Needless to say, the server 106 may use object classification solutions in many ways for providing better search engine services.

In other cases, the decision-tree based MLA 130 may be trained to determine, during in-use, a prediction value for a given object which is one from a continuous interval of prediction values. For example, some decision-tree based MLAs may be trained to determine for a given document-query pair a relevance score ranging from "0" to "1". In these cases, such decision-tree MLAs can be referred to as "regression" tree MLAs, since they are trained to perform a regression task on a given object. Needless to say, the server 106 may use relevance prediction solutions and other regression solutions in many ways for providing better search engine services.

Irrespective of whether the decision-tree based MLA 130 is used by the server 106 to perform a regression task or a classification task during in-use, the decision-tree based MLA 130 is first "built" (or trained) using a training dataset comprising training objects and respective target values. In those cases where the decision-tree based MLA 130 is trained for performing a classification task, a given target value for a given training object may be indicative of a ground-truth class associated with the given training object. In those cases where the decision-tree based MLA 130 is trained for performing a regression task, a given target value for a given training object may be indicative of a ground-truth value of a selected variable (for which the decision-tree based MLA 130 is trained to make predictions) for the given object.

To summarize, the implementation of the decision-tree based MLA 130 by the server 106 can be broadly categorized into two phases—a training phase and an in-use phase. First, the decision-tree based MLA 130 is trained during the training phase. Then, once the decision-tree based MLA 130 is built based on training data, the decision-tree based MLA 130 is actually employed by the server 106 using in-use data during the in-use phase. How the decision-tree based MLA 130 may be used during its in-use phase and how the decision-tree based MLA 130 may be trained based on a given training dataset will now be described in turn.

In-Use Phase

Figure 2:
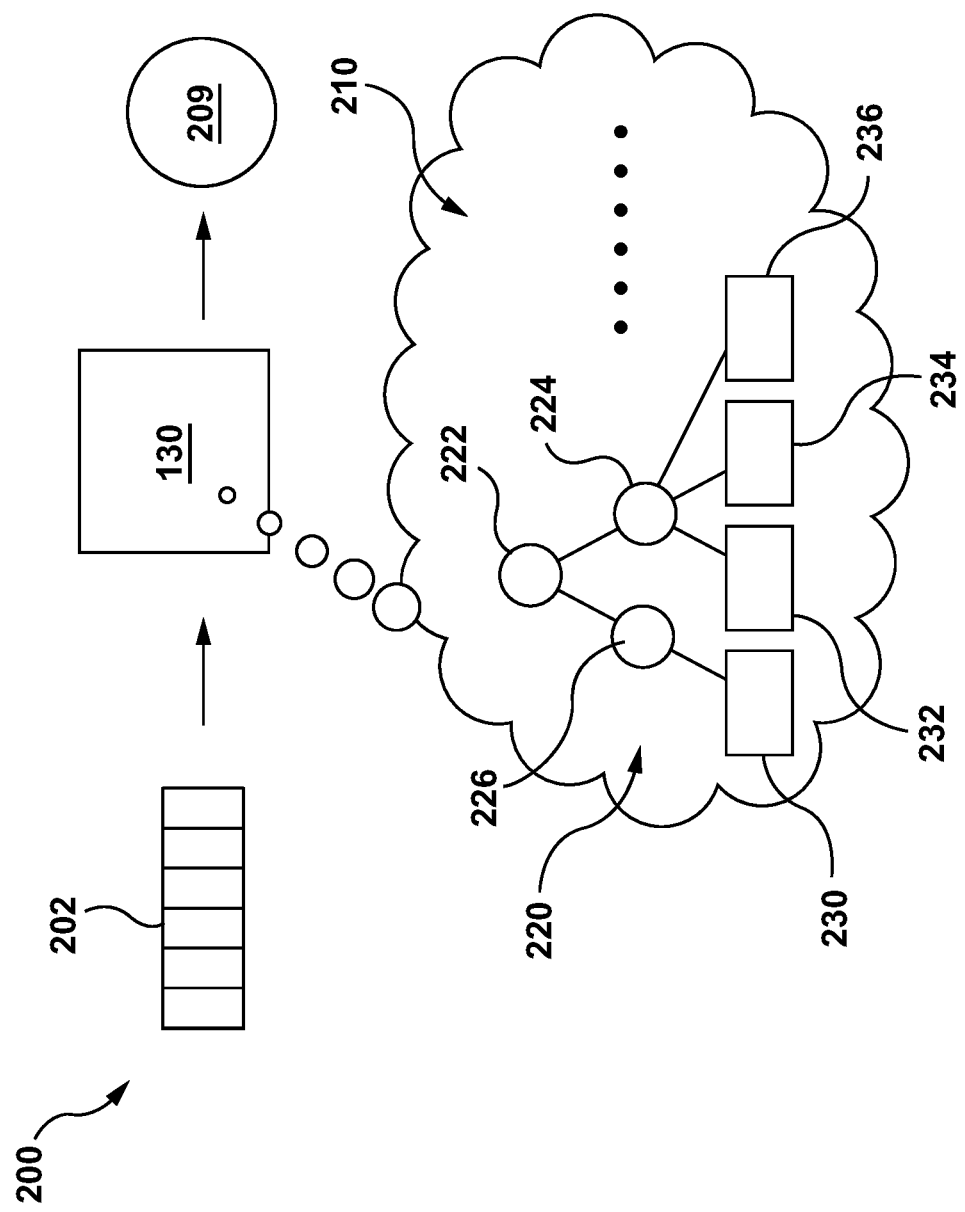
FIG. 2 is a schematic illustration an in-use iteration of a decision-tree based Machine Learning Algorithm (MLA) of the system of FIG. 1, in accordance with at least some non-limiting embodiments of the present technology.

With reference to FIG. 2, there is depicted a representation 200 of a (single) current in-use iteration of the in-use phase of the (trained) decision-tree based MLA 130. Naturally, the in-use phase of the decision-tree based MLA 130 may comprise a large number of in-use iterations that are performed similarly to the current in-use iteration depicted in FIG. 2. Generally speaking, during the current in-use iteration, the decision-tree based MLA 130 is inputted with in-use data about a given in-use object. For example, a given in-use object may be a document. In another example, the given in-use object may be a document-query pair. Irrespective of a type of the in-use object, the in-use data may be indicative of one or more features representative of the given in-use object.

As illustrated in FIG. 2, the in-use data about the given in-use object may be in a form of a feature vector 202. It should be noted that the feature vector 202 may be representative of one or more features of different types.

In one non-limiting example, a given feature may be of a binary type, and hence may have a value of "0" or "1". In another non-limiting example, a given feature may be of a real number type, and hence may have a real integer values and real non-integer values. In a further non-limiting example, a given feature may be of a categorical type, and hence may have a value representative of a sequence of characters such as a URL associated with the in-use object, a domain name, an IP address, a search query and/or a key word.

It should be noted that if the in-use object is a given document, the feature vector 202 may comprise one or more features associated with the given document. It should also be noted that if the in-use object is a given document-query pair, the feature vector 202 may comprise one or more features associated with the respective document from the given document-query pair, as well as one or more features associated with the respective query from the given document-query pair.

In some embodiments, in-use data for a given in-use object may be in a form of more than one feature vector. For example, if the in-use object is a given document-query pair, a first feature vector for the in-use object may comprise one or more features associated with the respective document from the given document-query pair, and a second feature vector for the in-use object may comprise one or more features associated with the respective query from the given document-query pair. Needless to say, how the given in-use object is processed for generating the feature vector 202 (and/or more than one feature vector) is not particularly limiting and may depend on inter alia a specific implementation of the present technology.

It should be noted that the (trained) decision-tree based MLA 130 is configured to output a "prediction" value 204 based on the feature vector 202. As it will become apparent from the description herein further below, a type of the prediction value 204 may depend on inter alia whether the decision-tree based MLA 130 is configured to perform a classification task or a regression task.

For example, in a case where the decision-tree based MLA 130 is trained to perform a classification task, the decision-tree based MLA 130 may be configured to predict based on the feature vector 202 whether the given in-use object (a given document, for example) is a news article or a scientific article. In these cases, the prediction value 204 may be indicative of either (i) a news article class, or (ii) a scientific article class. In another example, in a case where the decision-tree based MLA 130 is trained to perform a regression task, the decision-tree based MLA 130 may be configured to predict based on the feature vector 202 a relevance value for the given in-use object (a given document-query pair, for example). In these cases, the prediction value 204 may be a value ranging, for example, between "0" and "1".

Also, as it will become apparent from the description herein further below, the decision-tree based MLA 130 is based on a plurality of generated trees 210 that are used, in combination, for generating the prediction value 204. Broadly speaking, a given generated tree has a tree-like structure with nodes and branches, and which is used to make a prediction about a given in-use object by employing the in-use data provided thereto.

For example, the plurality of generated trees 210 comprises a generated tree 220. As it can be seen, the generated tree 220 has a root node 222, a pair of first level nodes 224 and 226, and four leaf nodes 230, 232, 234, and 236. It should be noted that the root node 222 and the first level nodes 224 and 226 are associated with respective features and split values allowing to, in a sense, "decide" which branches of the generated tree 220 are to be followed by the in-use object for arriving to a given one of the leaf nodes 230, 232, 234, and 236 based on the in-use data.

For example, let it be assumed that the in-use object is being analyzed by the generated tree 220. The server 106 may be configured to identify a given feature value in the feature vector 202 associated with a given feature corresponding to the respective feature of the root node 222. The server 106 may be configured to compare this value against the respective split value of the root node 222. Depending on how this value compares to the respective split value, the in-use object will be, in a sense, "directed" towards either the first level node 224 or the first level node 226. Recalling that the root node 222 and level nodes are associated with respective features and split values, a similar logic can be performed at a corresponding first level node for, in a sense, "directing" the in-use object towards one of the four leaf nodes 230, 232, 234, and 236.

It should also be noted that each of the leaf nodes 230, 232, 234, and 236 is associated with a respective leaf value. Let it be assumed that based on the in-use data (e.g., feature values in the feature vector 202) about the in-use object, the in-use object is "directed" towards the leaf node 230. In this case, the prediction of the generated tree 220 for the given in-use object is the leaf value of the leaf node 230. Recalling that the decision-tree based MLA 130 is based on the plurality of generated trees 210, individual predictions by respective generated trees from the plurality of generated trees 210 (e.g., the leaf values of leaf nodes of respective generated trees towards which the given in-use object is directed) are used together, in combination, for determining the prediction value 204 for the given in-use object.

How the individual predictions by respective generated trees from the plurality of generated trees 210 are combined for determining the prediction value 204 may depend on the specific implementations of the present technology. In one example however, the individual predictions by respective generated trees from the plurality of generated trees 210 may be added (and potentially weighted) for determining the prediction value 204.

Also, generated trees may vary in size and complexity and, therefore, may comprise more than one level of level nodes and more than four leaf nodes. The size and complexity of generated trees may depend on inter alia specific implementations of the present technology. How the server 106 is configured to build the generated trees from the plurality of generated trees 210 via training will now be discussed in greater detail.

Training Phase

One approach to building a decision-tree MLA is by using what is called "Gradient boosting". Generally speaking, Gradient Boosting (GB) can be used for both classification and regression problems. This technique creates a model from numerous "weak learners" (individual generated trees) which are added in a stage wise fashion with each new tree focusing on the errors of the previous ones to generate a so-called "forest of trees". This additive approach with a focus on errors made by the previous composition of the forest of trees and converts these weak learners into a single strong predictor. Another approach of building a decision-tree MLA is by using a modified GB technique, called "Stochastic Gradient Boosting". Broadly speaking, during a given training iteration in accordance with the Stochastic Gradient Boosting (SGB) approach, a subset of training objects are randomly selected for building a tree for that iteration. This stochastic sampling of training data has been shown to be beneficial for increasing the predictive quality of so-trained decision tree MLAs.

Developers of the present technology have devised methods and systems that are configured to execute a modified SGB algorithm. More particularly, as opposed to conventional SGB algorithms where randomness is introduced by sampling training examples to be used at respective training iterations, developers of the present technology have devised a modified SGB algorithm (referred to herein as Stochastic Gradient Langevin Boosting (SGLB) algorithm) where randomness is introduced by adding noise to "estimated gradient values" based on which a new generated tree is built during the given training iteration.

What the "estimated gradient values" are, how the "noise" is generated, and how the "noise" is then added to these "estimated gradient values", will be described in greater details herein further below. As it will become apparent from the description herein further below, employing the SGLB algorithm (as opposed to conventional SGB algorithm) may be beneficial for at least some types of optimizations. In at least one non-limiting implementation of the present technology, it can be said that the SGLB algorithm may outperform conventional SGB algorithms when performing non-convex loss function optimization.

In the context of the present technology, during execution of the SGLB algorithm by the server 106, the server 106 may be configured to perform a large number of training iterations where, during a respective training iteration, a newly generated tree is built and added to the current generated trees of the decision-tree based MLA 130. How the server 106 may be configured to execute a (single) current training iteration will now be described with reference to FIGS. 3 to 6. It should be noted that the example provided below will be directed to the decision-tree based MLA 130 being be built for performing regression tasks. However, it should be noted that a decision-tree MLA with classification trees may be built in a similar manner, without departing from the scope of the present technology.

Figure 3:
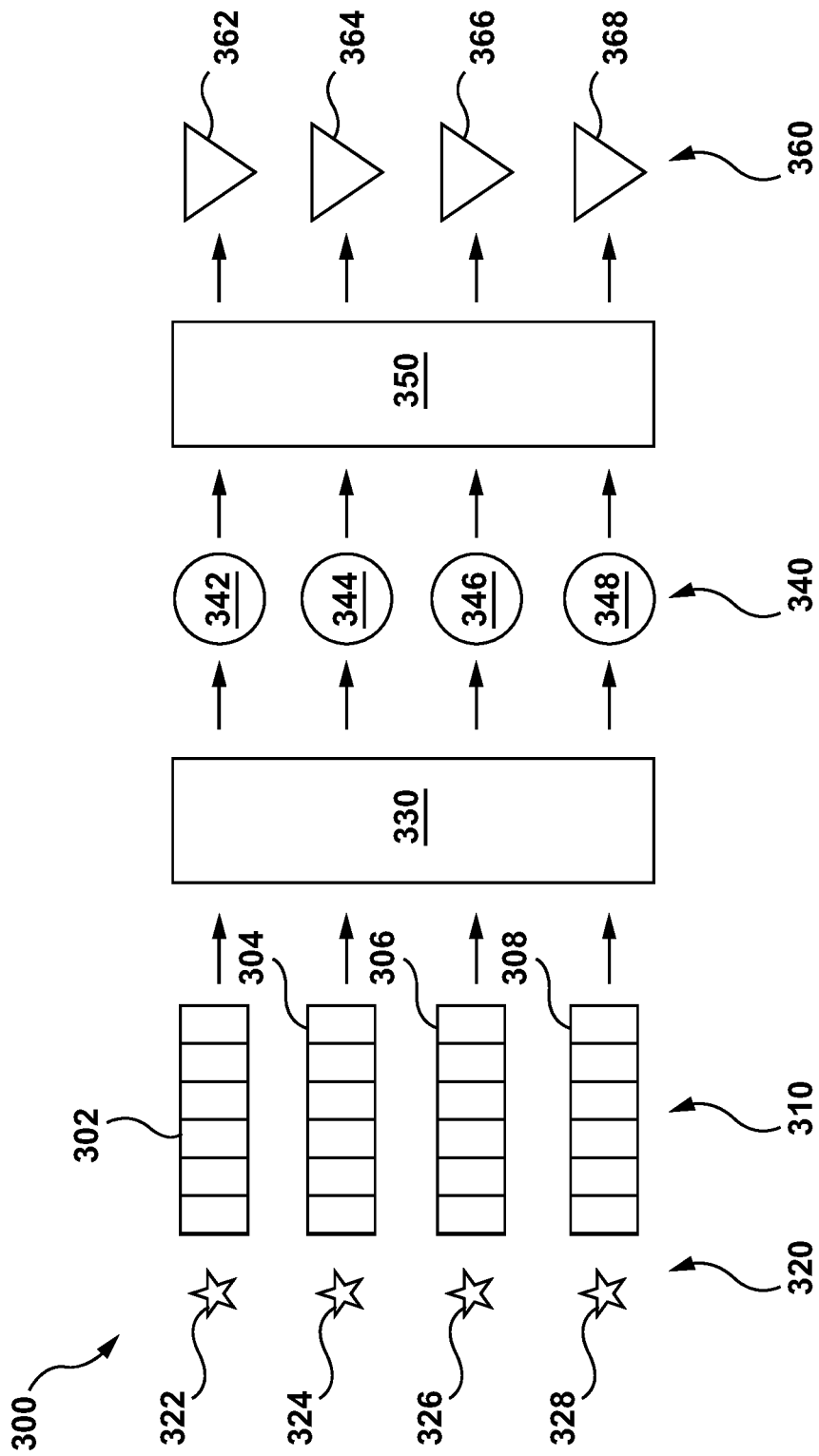
FIG. 3 is a schematic illustration of a training dataset used during a given training iteration of the decision-tree based MLA of FIG. 2, in accordance with at least some non-limiting embodiments of the present technology.

With reference to FIG. 3, there is depicted a training dataset 300 that is used to train the decision-tree based MLA 130. It should be noted that the server 106 may have access to the training dataset 300. For example, the training dataset 300 may be stored in the database system 150 and retrieved by and/or provided to the server 106 for training the decision-tree based MLA 130.

As illustrated, the training dataset 300 comprises a plurality of training objects represented by a plurality of training vectors 310 and a plurality of target values 320. Broadly speaking, a given training vector is representative of a respective training object, and a given target value is indicative of a ground-truth associated with a respective training object (the respective training vector). For example, the training dataset 300 comprises (i) for a first training object, a first training vector 302 and a first target value 322, (ii) for a second training object, a second training vector 304 and a second target value 324, (iii) for a third training object, a third training vector 306 and a third target value 326, and (iv) for a fourth training object, a fourth training vector 308 and a fourth target value 328.

Continuing with the above example of training the decision-tree based MLA 130 for performing a regression task, in some non-limiting embodiments of the present technology, the decision-tree based MLA 130 may be trained to predict relevance scores for respective document-query pairs. In this example, (i) the first training object may be a respective document-query pair stored in the database 150, (ii) the first training vector 302 may comprise one or more features of the respective document in that document-query pair and one or more features of the respective query in that document-query pair, (iii) and the first target value 322 may be part of the label data associated with the respective document-query pair stored in the database system 150 and representative of a value ranging from "0" to "1", for example.

It should be noted that during the given training iteration, the server 106 has already built a current plurality of generated trees 330 during previous training iterations (performed similarly to the current training iteration). As such, the purpose of the given training iteration is to build a new tree that is to be added to the current plurality of generated trees 330.

The server 106 is configured to input the plurality of training vectors 310 into the current plurality of generated trees 330. As a result, the current plurality of generated trees 330 outputs a plurality of prediction values 340. A given one from the plurality of prediction values 340 is therefore indicative of an output generated by the current plurality of generated trees 330 for a respective training object. For example, the current plurality of generated trees 330 outputs a first prediction value 342 for the first training vector 302, a second prediction value 344 for the second training vector 304, a third prediction value 346 for the third training vector 306, and a fourth prediction value 348 for the fourth training vector 308.

It should be noted that the current plurality of generated trees 330 are configured to predict a respective target value for a given training object based on the respective training vector. In other words, a given prediction value determined by the current plurality of generated trees 330 can be said to be an attempt by the current plurality of generated trees 330 to estimate the respective target value associated with the respective training vector.

The server 106 is configured to apply a loss function 350 for generating a plurality of estimated gradient values 360 for the plurality of prediction values 340. To that end, the server 106 may be configured to input the plurality of prediction values 340 and the plurality of target values 320 into the loss function 350 that outputs, for a respective prediction-target pair, a respective estimated gradient value.

How the loss function 350 is implemented is not limiting. As mentioned above, the decision-tree based MLA 130 may be trained for performing convex optimization, in which case the loss function 350 may be implemented as a convex loss function. In some non-limiting examples, a convex loss function may be one of, but is not limited to: hinge loss, logistic loss, and squared error loss. Also, the decision-tree based MLA 130 may be trained for performing non-convex optimization, in which case the loss function 350 may be implemented as a non-convex loss function. In other non-limiting examples, a non-convex loss function may be one of, but is not limited to: a 0-1 loss, Normalized Discounted Cumulative Gain (NDCG), and PFound.

Irrespective of a particular type of loss function used as the loss function 350, a given one from the plurality of estimated gradient values 360 is indicative of a difference between the target value and the respective prediction value (difference in the respective prediction-target pair) or, simply put, the current prediction error. For example, a first estimated gradient value 362 is indicative of a difference between the first target value 322 and the first prediction value 342, a second estimated gradient value 364 is indicative of a difference between the second target value 324 and the second prediction value 344, a third estimated gradient value 366 is indicative of a difference between the third target value 326 and the third prediction value 346, and a fourth estimated gradient value 368 is indicative of a difference between the fourth target value 328 and the fourth prediction value 348.

It should be noted that the difference in a given prediction-target pair is representative of an error that the current plurality of generated trees 330 made in their attempt to predict the respective target for a given training object. Needless to say, the specific type of error being determined depends on inter alia the type of loss function being used in various implementations of the present technology.

In at least some embodiments of the present technology, the server 106 may be configured to execute a shrinkage procedure on the plurality of prediction values 340.

Generally speaking, the shrinkage procedure is a type of a regularization technique that allows reducing overfitting of the model being learned. This means that the shrinkage procedure may be used by the server 106 for constraining the fitting of the model, by reducing individual contribution of respective trees being added to the model. For example, the server 106 may be configured to use a shrinkage parameter in accordance with equation (1) below:

$$spv_i = (1-\epsilon\gamma)pv_i \quad (1)$$

where $pv_i$ is a given prediction value from the plurality of prediction values 340, $(1-\epsilon\gamma)$ is the shrinkage parameter, $\epsilon$ is a learning rate parameter, $\gamma$ is a regularization parameter, and $spv_i$ is a respective shrunk prediction value.

It should be noted that the shrinkage parameter is smaller than "1", and therefore, a given shrunk prediction value is smaller than the respective prediction value. In cases where the server 106 may be configured to perform the shrinkage procedure, a given one from the plurality of estimated gradient values 360 may be indicative of a difference between the target value and a respective one of the plurality of shrunk prediction values (instead of the respective one of the plurality of prediction values 340).

Figure 4:
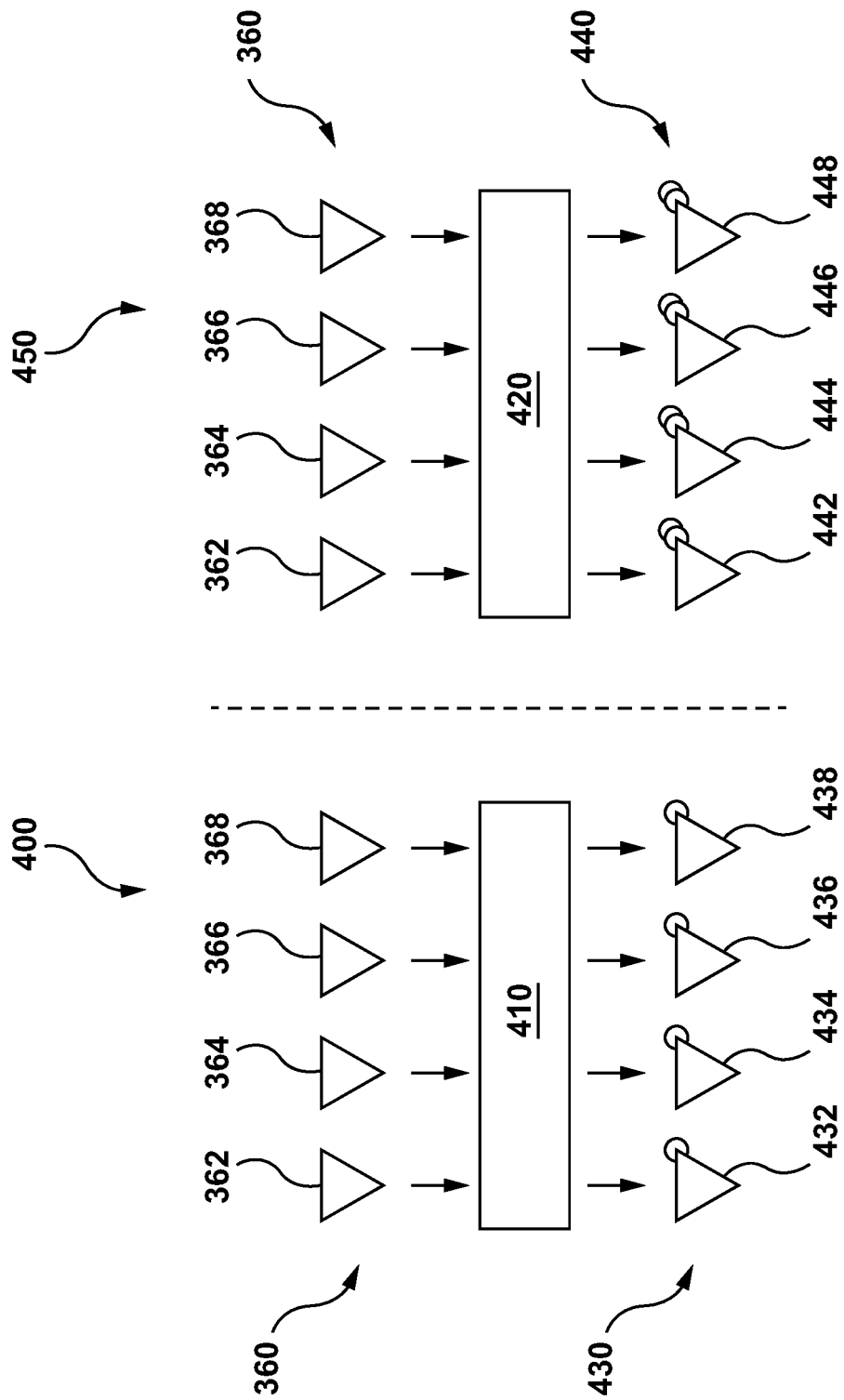
FIG. 4 is a schematic illustration of a first noise-injecting function and of a second noise-injecting function used for determining a first plurality of noisy estimated gradient values and a second plurality of noisy estimated gradient values, respectively, in accordance with at least some non-limiting embodiments of the present technology.

With reference to FIG. 4, during the given training iteration, the server 106 is also configured to use the plurality of estimated gradient values 360 for generating a first plurality of noisy estimated gradients 430, and a second plurality of noisy estimated gradients 440. For example, the server 106 may be configured to apply a first noise-injecting function 410 onto the plurality of estimated gradient values 360 for generating the first plurality of noisy estimated gradients 430. The server 106 may be configured to apply a second noise-injecting function 420 onto the plurality of estimated gradient values 360 for generating the second plurality of noisy estimated gradients 440.

How the first noise-injecting function 410, the second noise-injecting function 420 can be implemented in the context of the present technology is described in greater detail in an a yet unpublished article, entitled "Stochastic Gradient Langevin Boosting", which is appended herewith and the content of which is incorporated herein by reference in its entirety. As it will be understood by a person skilled in the art having appreciated the present disclosure, using so-determined stochastic estimated gradient values during the given iteration may allow both exploration and exploitation of training data for increasing the predictive quality of the decision-tree based MLA 130.

In some embodiments of the present technology, it is contemplated that the first noise-inducing function 410 may be implemented in accordance with equation (2) below:

$$\zeta_i = \mathcal{N}(0, 2\epsilon\beta^{-1}) \quad (1)$$

where $\zeta_i$ is a given noise value to be added to $i^{th}$ estimated gradient value to generate the $i^{th}$ first noisy estimated gradient value from the first plurality of noisy estimated gradient values 430, $\mathcal{N}$ ("mean", "variance") being a normal distribution function, $\epsilon$ is the learning rate parameter, $\beta$ is the inverse Langevin diffusion temperature parameter.

It is also contemplated that the second noise-inducing function 420 may be implemented in accordance with equation (3) below:

$$\zeta_i' = \mathcal{N}(0, 2\epsilon\beta^{-1}) \quad (2)$$

where $\zeta_i'$ is a given noise value to be added to $i^{th}$ estimated gradient value to generate the $i^{th}$ second noisy estimated gradient value from the second plurality of noisy estimated gradient values 440, $\mathcal{N}$ ("mean", "variance") being a normal distribution function, $\epsilon$ is the learning rate parameter, $\beta$ is the inverse Langevin diffusion temperature parameter.

It should be noted that since the variance of the normal distribution function $\mathcal{N}(\,)$ is dependent on the learning rate parameter E, the smaller the learning rate parameter, the smaller the variance of the normal distribution function, the larger the noise component that will be added to respective estimated gradient values.

In at least some embodiments of the present technology, it is contemplated that the server 106 may be configured to apply the first noise-inducing function 410 on the plurality of estimated gradient values 360 independently from applying the second noise-inducing function 420 on the plurality of gradient values 360. It can also be said that the server 106 may be configured to generate the first plurality of noisy estimated gradient values 430 independently from generating the second plurality of noisy estimated gradient values 440.

Furthermore, it is also contemplated that the server 106 may be configured to use the first noise-inducing function 410 for generating the first plurality of noisy estimated gradient values 430 at a first moment in time, and use the second noise-inducing function 420 for generating the second plurality of noisy estimated gradient values 440 at a second moment in time. As it will become apparent from the description herein further below, the server 106 may be configured to (i) generate the first plurality of noisy estimated gradient values 430 prior to and for determining "noisy candidate trees", and (ii) generate the second plurality of noisy estimated gradient values 440 prior to and for determining an "iteration-specific tree".

Figure 5:
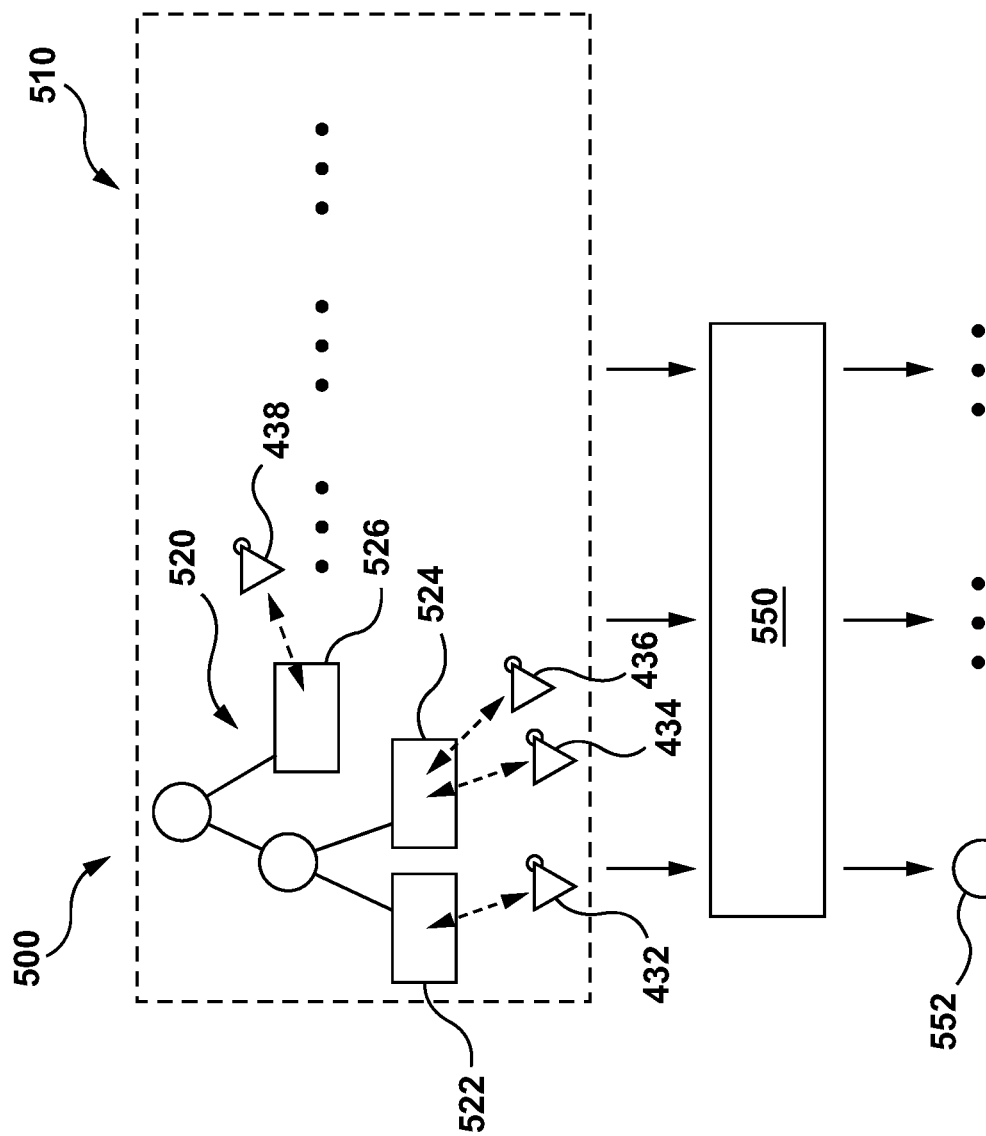
FIG. 5 is a schematic illustration of a plurality of candidate trees generated during the given training iteration of the decision-tree based MLA of FIG. 2, in accordance with at least some non-limiting embodiments of the present technology.

How the server 106 may be configured to generate noisy candidate trees for the given training iteration based on the first plurality of noisy estimated gradient values 430 will now be described in greater details with reference to FIG. 5. There is depicted a representation 500 of a plurality of noisy candidate trees 510 that are generated by the server 106 based on the first plurality of noisy estimated gradient values 430.

Continuing with the example of the decision-tree based MLA 130 being trained for solving a regression task, the plurality of noisy candidate trees 510 that the server 106 generates are regression trees. However, it should be noted that in cases where the decision-tree based MLA 130 is being trained for solving a classification task, the corresponding noisy candidate trees that the server 106 may be configured to generate may be classification trees, without departing from the scope of the present technology.

In at least some non-limiting embodiments of the present technology, the server 106 may be configured to use at least some conventional tree-building algorithms for building the plurality of noisy candidate trees 510.

For example, the server 106 may be configured to build a given noisy candidate tree in a greedy manner. In some cases, the server 106 may create a root node for the given noisy candidate tree, and parse through various features of the training objects to select split values for additional nodes that maximizes one or more pre-determined splitting criteria. Once pre-determined stopping criteria is met, the server 106 may stop the building process or otherwise may continue to an other node of that tree. In some instances, maximum tree depth may be used as a pre-determined criterion and which refers to the maximum number of layers in the tree (sometimes deeper trees are more likely to overfit the data). The pre-determined criteria relating to number of nodes and/or number of observations per split may also be used.

In at least one non-limiting embodiments of the present technology, the server 106 may be configured to generate the plurality of noisy candidate trees 510 in accordance with the Catboost framework. It should be noted that the server 106 may build the plurality of noisy candidate trees 510 in different ways. However, it is important to note that the server 106 is configured to build the plurality of noisy candidate trees 510 based on the first plurality of noisy estimated gradients 430, as opposed to the plurality of estimated gradient values 360.

The server 106 is configured to use the first plurality of estimated gradients 430 for generating the plurality of noisy candidate trees 510 and where the noisy candidate trees from the plurality of noisy candidate trees 510 have different tree structures. It should also be noted that the plurality of noisy candidate trees 510 generated based on the first plurality of noisy estimated gradient values 430 may have different tree structures to candidate trees that would otherwise be built based on the plurality of estimated gradient values 360.

It should be noted that, once built, a given noisy candidate tree from the plurality of noisy candidate trees 510 has a plurality of leaf nodes with respective leaf values and where the respective leaf values are based on the first plurality of noisy estimated gradient values 430. To better illustrate this, reference will be made to a first noisy candidate tree 520 that the server 106 builds during the given training iteration.

The first noisy candidate tree 520 from the plurality of noisy candidate trees 510 has three leaf nodes, namely a first leaf node 522, a second leaf node 524, and a third leaf node 526. In this example, the server 106 builds the first noisy candidate tree 520 where the first leaf node 522 is associated with the noisy estimated gradient value 432. This means that, if the first noisy candidate tree 520 is inputted with the training vector 302 associated with the first training object, the first training object would be funneled to the first leaf node 522. Continuing with this example, the server 106 builds the first noisy candidate tree 520 where the second leaf node 524 is associated with the noisy estimated gradient values 434 and 436. This means that, if the first noisy candidate tree 520 is inputted with the feature vector 304 associated with the second training object and the feature vector 306 associated with the third training object, the second training object and the third training object would be funneled to the second leaf node 524. Continuing with this example, the server 106 builds the first noisy candidate tree 520 where the third leaf node 526 is associated with the noisy estimated gradient value 438. This means that, if the first noisy candidate tree 520 is inputted with the feature vector 308 associated with the fourth training object, the fourth training object would be funneled to the third leaf node 526.

It should be noted that a given leaf node that corresponds to a single noisy estimated gradient value from the first plurality of estimated gradient values 430, the server 106 may determine that the leaf value for that given leaf node is the single noisy estimated gradient value from the first plurality of noisy estimated gradient values 430. However, in cases where a given leaf node that corresponds to more than one noisy estimated gradient values from the first plurality of estimated gradient values 430, the server 106 may be configured to determine a leaf value for that given leaf node based on the more than one noisy estimated gradient values corresponding therewith.

For example, for the second leaf node 524 of the first noisy candidate tree 520 that corresponds to the noisy estimated gradient values 434 and 436, the server 106 may be configured to determine an aggregated value by aggregating the noisy estimated gradient values 434 and 436 and use this aggregated value as the leaf value for the second leaf node 524 of the first noisy candidate tree 520.

Once the plurality of noisy candidate trees 510 are so-generated by the server 106, the server 106 may be configured to apply a selection metric 550 to the leaf values of the plurality of noisy candidate trees 510 to select a "target tree" amongst the plurality of noisy candidate trees 510. Broadly speaking, the target tree is a given noisy candidate tree that has leaf values that are closest to respective noisy estimated gradient values from the first plurality of noisy estimated gradient values 430 than leaf values of any other noisy candidate tree.

For example, the selection metric 550 may be a sum of squared differences between the leaf values of a given noisy candidate tree and the corresponding noisy estimated gradient values from the first plurality of noisy estimated gradient values 430. In other words, by applying the selection metric 550, in some embodiments, the server 106 may be configured to generate for the given noisy candidate tree 520 a selection metric value 552 being a sum of squared differences between the leaf values of the given noisy candidate tree 520 and the corresponding noisy estimated gradient values from the first plurality of noisy estimated gradient values 430.

For example, by applying the selection metric 550 on the noisy candidate tree 520, the server 106 may be configured to determine the selection metric value 552 as a sum of:
(i) a squared difference between the noisy estimated gradient value 432 and the first leaf value (leaf value of a given leaf node associated with the first training object)—in this case, since the first leaf value is the noisy estimated gradient value 432, the squared difference therebetween is null;

(ii) a squared difference between the noisy estimated gradient value 434 and the second leaf value (leaf value of a given leaf node associated with the second training object and the third training object)—in this case, since the second leaf value is an aggregated value based on the noisy estimated gradient values 434 and 436, the squared difference between the noisy estimated gradient value 434 and the second leaf value is non-null;

(iii) a squared difference between the noisy estimated gradient value 436 and the second leaf value (leaf value of a given leaf node associated with the second training object and the third training object)—in this case, since the second leaf value is an aggregated value based on the noisy estimated gradient values 434 and 436, the squared difference between the noisy estimated gradient value 434 and the second leaf value is non-null; and (iv) a squared difference between the noisy estimated gradient value 438 and the third leaf value (leaf value of a given leaf node associated with the fourth training object) in this case, since the third leaf value is the noisy estimated gradient value 438, the squared difference therebetween is null.

The server 106 is configured to so-determined respective selection metric values for respective ones of the plurality of noisy candidate trees 510 and select, as a target tree, a given noisy candidate tree having a lowest selection metric value amongst the selection metric values of the plurality of noisy candidate trees 510. Let it be assumed that the selection metric value 522 for the first noisy candidate tree 520 is the lowest one amongst the selection metric values of the plurality of noisy candidate trees 510. In that case, the server 106 may be configured to select the first noisy candidate tree 520 as the target tree.

Developers of the present technology have realized that using the first plurality noisy estimated gradient values 430 for building the plurality of noisy candidate trees 510 and selecting one of the plurality of noisy candidate trees 510 as the target tree for further generating the iteration-specific tree of the given training iteration may allow to linearly reduce a possibly infinite dimensional problem of learning an almost optimal finite ensemble to a finite dimensional problem of finding optimal predictions.

Figure 6:
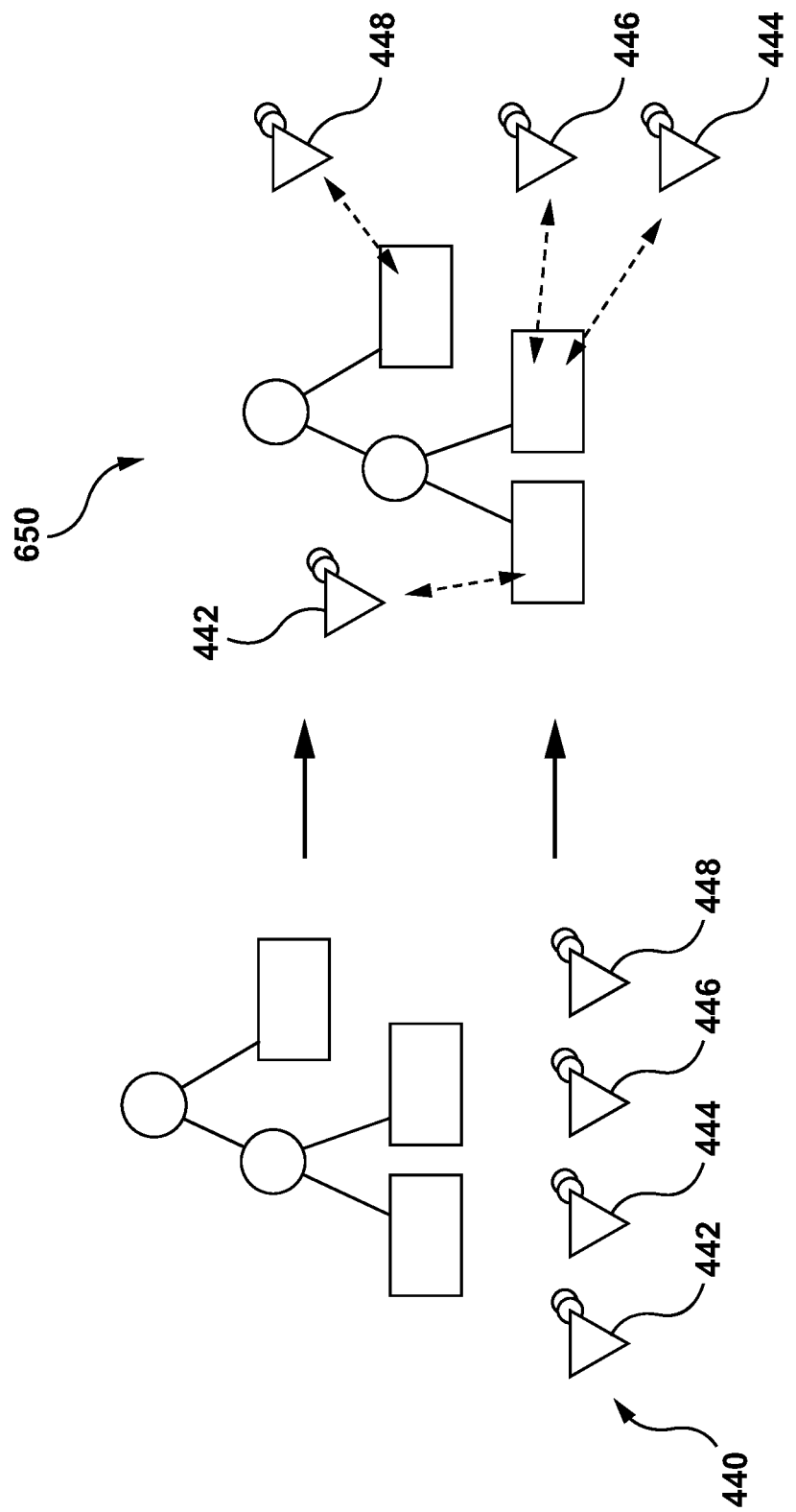
FIG. 6 is a schematic illustration of an iteration-specific tree generated for the given training iteration of the decision-tree based MLA of FIG. 2, in accordance with at least some non-limiting embodiments of the present technology.

How the server 106 may be configured to use the so-selected target tree for generating a given iteration-specific tree will now be described with reference to FIG. 6. Broadly speaking, the server 106 is configured to generate an iteration-specific tree 650, for the given training iteration, by using the target tree (in the above example, the noisy candidate tree 520) and the second plurality of noisy estimated gradient values 440 (see FIG. 4). To that end, the server 106 may be configured to determine new leaf values for the respective leaf nodes of the target tree based on the second plurality of noisy estimated gradient values 440. As a result, it can be said that target tree with these new leaf values is the iteration-specific tree 650 generated by the server 106.

Recalling that the first training object is associated with the first leaf node 522, the server 106 may determine that the first leaf node 522 corresponds to the noisy estimate gradient value 422. Also, since the second training object and the third training object are associated with the second leaf node 524, the server 106 may determine that the second leaf node 524 corresponds to the noisy estimated gradient values 444 and 446. Also, since the fourth training object is associated with the third leaf node 526, the server 106 may determine that the third leaf node 526 corresponds to the noisy estimated gradient value 448.

Similarly to what has been described previously, if the server 106 determines that a given leaf node of the target tree corresponds to a single noisy estimated gradient value, the server 106 may determine that the leaf value to be associated with the given leaf node is the single noisy estimated gradient value. In this example, thus, the server 106 may determine that the new leaf value for the first leaf node 522 is the noisy estimated gradient value 442 and that the new leaf value for the third leaf node 526 is the noisy estimated gradient value 448. Also, similarly to what has been described above, if the server determines that a given leaf node of the target tree corresponds to more than one noisy estimated gradient values from the second plurality of noisy estimated gradient values 440, the server 106 may be configured to determine an aggregated value based on the more than one noisy estimated gradient values and use the aggregated value as the new leaf value for that leaf node. In this example, thus, the server 106 may determine an aggregated value for the second leaf node 522 based on the noisy estimated gradient values 444 and 446, and use that aggregated value as the new leaf value for the second leaf node 522.

In summary, during the given training iteration, the server 106 may be configured to use the training dataset 300 and the current plurality of generated trees 330 for generating a plurality of prediction values 340, and may use the loss function 350 for generating the plurality of estimated gradient values 360 (see FIG. 3). The server 106 may also be configured to generate the first plurality of noisy estimated gradient values 430 and the second plurality of noisy estimated gradient values 440 based on the plurality of estimated gradient values 360 (see FIG. 4). The server 106 may also be configured to generate the plurality of candidate trees 510 (which may have different structures) based on the first plurality of noisy estimated gradient value 430, instead of the plurality of estimated gradient values 360 (see FIG. 5). The server 106 may also be configured to apply the selection metric 550 for the purpose of selecting a given target tree amongst the plurality of candidate trees 510. The server 106 may also be configured to use the second plurality of noisy estimated gradient values 440 for updating leaf values and/or determining new leaf values for the so-selected target tree, thereby generating the iteration-specific tree 650 (see FIG. 6).

In some embodiments, the server 106 may be configured to store the iteration-specific tree 650 with the current plurality of generated trees 330 in the database system 150. The server 106 may be configured to perform a next training iteration similarly to the given training iteration, but instead of using the current plurality of generated trees 330, the server 106 may be configured to use the current plurality of generated trees 330 and the iteration-specific tree 650.

In some embodiments, the server 106 may be configured to execute a regularization procedure the iteration-specific tree. For example, the server 106 may be configured to weigh the leaf values of the iteration-specific tree 650 by the learning rate parameter E for generating a plurality of regularized leaf values (and/or a regularized iteration-specific tree 650). The server 106 may thus use the regularized iteration-specific tree 650 during the next training iteration of the decision-tree based MLA 130. It should be noted that performing the above-mentioned regularization procedure on the iteration-specific tree 650, similarly to a shrinkage procedure, reduces the contribution of a given iteration-specific tree to the model as a whole. It can be said that employing the shrinkage procedure and/or the regularization procedure mentioned above may allow, in a sense, to take "smaller steps" towards minimization of a given loss function and which has been empirically shown to increase the predictive quality of the model by reducing overfitting.

Figure 7:
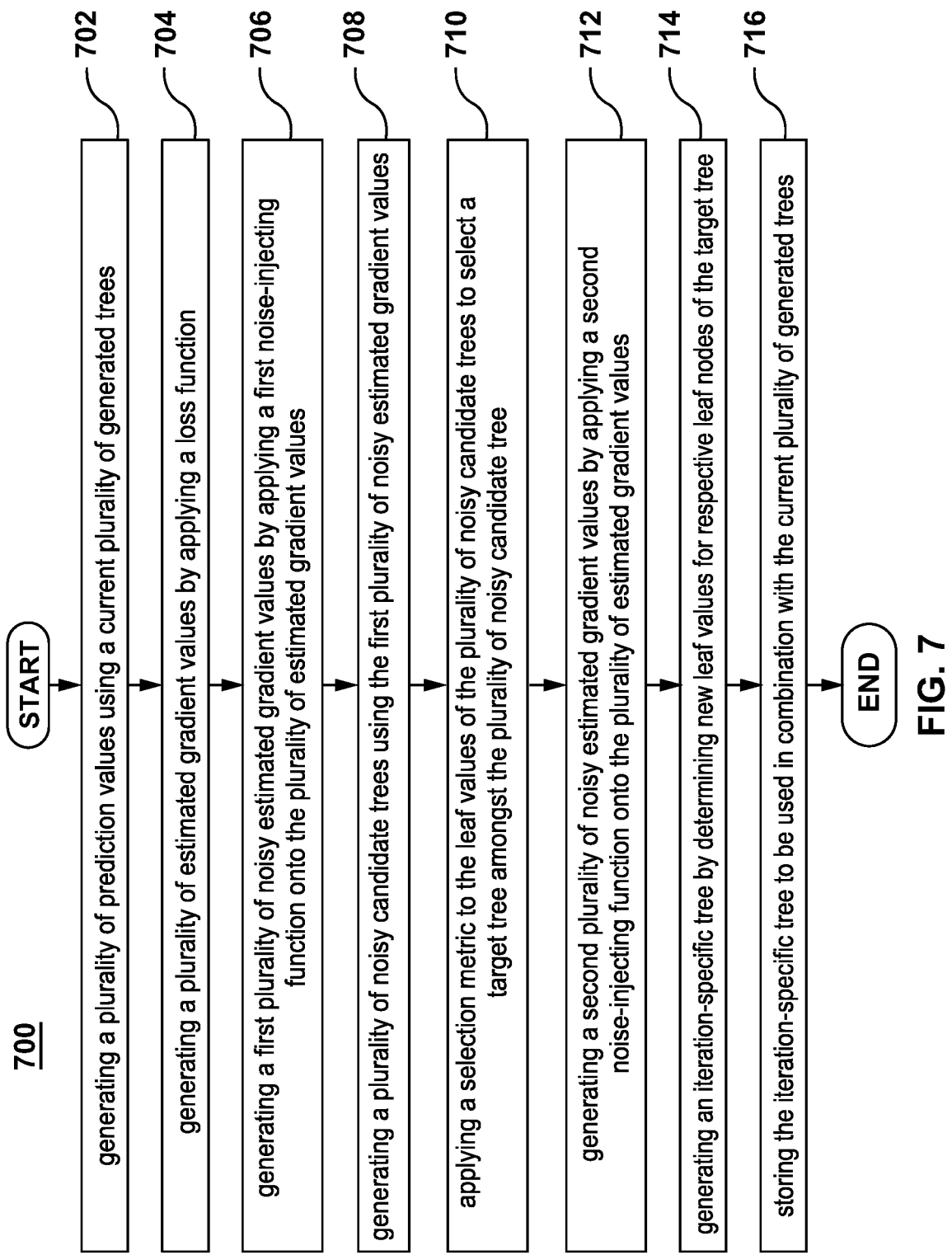
FIG. 7 is a scheme-block representation of a method of training the decision-tree based MLA of FIG. 2 by a server of FIG. 1, as envisioned in at least some non-limiting embodiments of the present technology.

With reference to FIG. 7, there is depicted a scheme-block representation of a method 700 as contemplated in at least some non-limiting embodiments of the present technology. Various steps of the method 700 of training the decision-tree based MLA 130 will now be discussed in greater detail.

Step 702: Generating a Plurality of Prediction Values Using a Current Plurality of Generated Trees The method 700 begins at step 702 with the server 106 configured to, during a given training iteration of the decision-tree based MLA 130, generate the plurality of prediction values 340 using the current plurality of generated trees 330 of the decision-tree based MLA 130. It should be noted that the current plurality of generated trees 330 may refer to the already-generated trees of the decision-tree based MLA 130 by a moment in time when the given training iteration begins.

It should also be noted that a given one from the plurality of prediction values 340 is indicative of an output generated by the current plurality of generated trees 330 for the target value of the respective one of the plurality of training objects. For example, the training dataset 300 for training the decision-tree based MLA 130 may comprise the plurality of training objects represented by the plurality of training vectors 310 and the plurality of target values 320.

As explained above, in some non-limiting embodiments, the decision-tree based MLA 130 may be trained for performing a regression task during its in-use phase. In other non-limiting embodiments, however, the decision-tree. MLA 130 may be trained for performing a classification task.

In some embodiments of the present technology, the server 106 may be configured to "shrink" the plurality of prediction values 340. As previously alluded to, in some implementations, shrinking predictions may allow increase the predictive quality of the decision-tree MLA 130 by reducing data overfitting. For example, during the given training iteration, the server 106 may execute the shrinkage procedure on the plurality of prediction values 340 by using the shrinkage parameter in the equation (1) for generating the plurality of shrunk prediction values. A given shrunk prediction value is smaller than the respective prediction value.

Step 704: Generating a Plurality of Estimated Gradient Values by Applying a Loss Function The method 700 continues to step 704 with the server 106 configured to, during the given training iteration of the decision-tree based MLA 130, generate the plurality of estimated gradient values 360 by applying the loss function 350. It should be noted that a given one from the plurality of estimated gradient values 360 is indicative of a difference between the target value and the respective one of the plurality of prediction values 340. As explained above, the "difference" between the target value and the respective one of the plurality of prediction values 340 may depend on a type of the loss function 350 used and therefore depends on the specific implementation of the present technology.

In one non-limiting example, the loss function 350 may be a given convex loss function. In an other non-limiting example, the loss function 350 may be a given non-convex loss function (such as a 0-1 loss function, for example). Therefore, it can be said that the decision-tree based MLA 130 may be configured to perform convex, as well as non-convex optimization, and which depends on the specific implementation of the present technology.

It should be noted that in those embodiments where the server 106 performs the shrinkage procedure on the plurality of prediction values 340, the plurality of shrunk prediction values (instead of the plurality of prediction values 340) may be inputted into the loss function 350 along with the plurality of target values 320. In these embodiments, a given one from the plurality of estimated gradient values may be indicative of a difference between the target value and a respective one of the plurality of shrunk prediction values.

Step 706: Generating a First Plurality of Noisy Estimated Gradient Values by Applying a First Noise-Injecting Function onto the Plurality of Estimated Gradient Values The method 700 continues to step 706 with the server 106 configured to, during the given training iteration, generate the first plurality of noisy estimated gradient values 430 by applying the first noise-injecting function 410 onto the plurality of estimated gradient values 360. In some embodiments of the present technology, the server 106 may implement the first noise-inducing function 410 in accordance with the equation (2).

Step 708: Generating a Plurality of Noisy Candidate Trees Using the First Plurality of Noisy Estimated Gradient Values The method 700 continues to step 708 with the server 106 configured to generate the plurality of noisy candidate trees 510 using the first plurality of noisy estimated gradient values 430. It is important to note that the plurality of noisy candidate trees 510 are generated on "noisy" estimated gradient values as opposed to being generated based on the estimated gradient values outputted by the loss function 350.

A given one of the plurality of noisy candidate trees 510 have a respective plurality of leaf nodes with respective leaf values, and the respective leaf values are based on the first plurality of noisy estimated gradient values 430. For example, the server 106 may be configured to generate the given one of the plurality of noisy candidate trees 510 by determining, by the server, a tree structure for the given one of the plurality of noisy candidate trees 510 based on the first plurality of noisy estimated gradient values 430. The tree structure has the respective plurality of leaf nodes each of which corresponds to at least one of the first plurality of noisy estimated gradient values 430.

It should be noted that for a given leaf node corresponding to more than one of the first plurality of noisy estimated gradient values 430 (for example, the leaf node 524 corresponding to noisy estimated gradients values 434 and 436 on FIG. 4), the server 106 may be configured to aggregate the more than one of the first plurality of noisy estimated gradient values 430, thereby the server 106 is configured to determine an aggregated value. The server 106 may be configured to use the aggregated value as the respective leaf value of the given leaf node. However, for an other given leaf node of the respective plurality of leaf nodes corresponding to only one of the first plurality of noisy estimated gradient values 430 (for example, the leaf node 522 corresponding to noisy estimated gradients value 432 on FIG. 4), the server 106 may be configured to use the only one of the first plurality of noisy estimated gradient values 430 as the respective leaf value.

Step 710: Applying a Selection Metric to the Leaf Values of the Plurality of Noisy Candidate Trees to Select a Target Tree Amongst the Plurality of Noisy Candidate Trees The method 700 continues to step 710 with the server 106 configured to apply the selection metric 550 to the leaf values of the plurality of noisy candidate trees 510 to select a target tree amongst the plurality of noisy candidate trees 510.

It should be noted that the target tree is a given noisy candidate tree having leaf values that are closest to respective noisy estimated gradient values from the first plurality of noisy estimated gradient values 430 than leaf values of any other noisy candidate tree.

In at least one embodiment, the selection metric 550 may be a sum of squared differences between the leaf values of a given noisy candidate tree and the corresponding estimated gradient values from the first plurality of estimated gradient values 430. For example, a server 106 may be configured to apply the selection metric 550 onto the noisy candidate tree 520 and, as a result, determine the selection metric value 552 for the noisy candidate tree 520. The server 106 may also be configured to so-determine respective selection metric values for respective ones of the plurality of noisy candidate trees 510 and select, as a target tree, a given noisy candidate tree having a lowest selection metric value amongst the selection metric values of the plurality of noisy candidate trees 510. Let it be assumed that the selection metric value 522 for the first noisy candidate tree 520 is the lowest one amongst the selection metric values of the plurality of noisy candidate trees 510. In that case, the server 106 may be configured to select the first noisy candidate tree 520 as the target tree.

Step 712: Generating a Second Plurality of Noisy Estimated Gradient Values by Applying a Second Noise-Injecting Function onto the Plurality of Estimated Gradient Values The method 700 continues to step 712 with the server 106 configured to generate the second plurality of noisy estimated gradient values 440 by applying the second noise-injecting function 420 onto the plurality of estimated gradient values 360. For example, the second noise-inducing function 440 applied by the server 106 may be implemented in accordance with equation (3).

It is contemplated that in at least some embodiments of the present technology, the first noise-inducing function 410 is independent from the second noise-inducing function 420. In is also contemplated that the first plurality of noisy estimated gradient values 430 may be generated independently from the second plurality of noisy estimated gradient values 440, and without departing from the scope of the present technology.

Step 714: Generating an Iteration-Specific Tree by Determining New Leaf Values for Respective Leaf Nodes of the Target Tree The method 700 continues to step 714 with the server 106 configured to generate the iteration-specific tree 650 by determining new leaf values for respective leaf nodes of the target tree. The new leaf values are determined by the server 106 based on the second plurality of noisy estimated gradient values 440.

It should be noted that for a given leaf node of the target tree corresponding to more than one of the second plurality of noisy estimated gradient values 440, the server 106 may be configured to aggregate the more than one of the second plurality of noisy estimated gradient values 440, thereby the server 106 may determine an aggregated value for that lead node. The server 106 may also use the aggregated value as the new leaf value of the given leaf node. However, for an other given leaf node of the target tree corresponding to only one of the second plurality of noisy estimated gradient values 440, the server 106 may be configured to use the only one of the second plurality of noisy estimated gradient values 440 to be used as the new leaf value of the other given leaf node.

Step 716: Storing the Iteration-Specific Tree to be Used in Combination with the Current Plurality of Generated Trees The method 700 continues to step 716 with the server 106 configured to store the iteration-specific tree 650 to be used, by the server 106, in combination with the current plurality of generated trees 330. For example, the server 106 may be configured to store the information representative of the iteration-specific tree 650 in the database system 150.

In some embodiments, the server 106 may be configured to execute a regularization procedure on the new (e.g., most recent) leaf values of the iteration-specific tree 650. For example, the server 106 may be configured to execute the regularization procedure prior to employing the iteration-specific tree during a next training iteration of the decision-tree based MLA 130. In some embodiments, the server may execute the regularization procedure by using a learning rate parameter (as explained above) for generating a plurality of regularized leaf values, and where a given regularized leaf value is smaller than the respective leaf value. The server 106 may then use the iteration-specific tree 650 with the plurality of regularized leaf values and the current plurality of generated trees 330 during the next training iteration of the decision-tree based MLA 130.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of training a decision-tree based Machine Learning Algorithm (MLA) for providing search results in response to a query, the decision-tree based MLA being based on a plurality of generated trees, a given one from the plurality of generated trees having a respective plurality of leaf nodes having respective leaf values, the plurality of generated trees being trained to predict a relevancy of search results to the query, the method executable by a server having access to a training dataset, the training dataset comprising a plurality of training objects and a plurality of target values, each training object of the plurality of training objects comprising a query and a representation of a web page, a given one of the plurality of target values being indicative of a ground-truth associated with a given one of the plurality of training objects, the method comprising:

during a given training iteration of the decision-tree based MLA:

generating, by the server, a plurality of prediction values using a current plurality of generated trees, a given one from the plurality of prediction values being indicative of an output generated by the current plurality of generated trees for the target value of the respective one of the plurality of training objects;

generating, by the server, a plurality of estimated gradient values by applying a loss function, a given one from the plurality of estimated gradient values being indicative of a difference between the target value and the respective one of the plurality of prediction values;

generating, by the server, a first plurality of noisy estimated gradient values by applying a first noise-injecting function onto the plurality of estimated gradient values;

generating, by the server, a plurality of noisy candidate trees using the first plurality of noisy estimated gradient values, a given one of the plurality of noisy candidate trees having a respective plurality of leaf nodes with respective leaf values, the respective leaf values being based on the first plurality of noisy estimated gradient values, applying, by the server, a selection metric to the leaf values of the plurality of noisy candidate trees to select a target tree amongst the plurality of noisy candidate trees, the target tree being a given noisy candidate tree having leaf values that are closest to respective noisy estimated gradient values from the first plurality of noisy estimated gradient values than leaf values of any other noisy candidate tree;

generating, by the server, a second plurality of noisy estimated gradient values by applying a second noise-injecting function onto the plurality of estimated gradient values;

generating, by the server, an iteration-specific tree by determining new leaf values for respective leaf nodes of the target tree, the new leaf values being determined based on the second plurality of noisy estimated gradient values; and storing, by the server, the iteration-specific tree to be used, by the server, in combination with the current plurality of generated trees.

2. The method of claim 1, wherein the loss function is one of a convex loss function and a non-convex loss function.

3. The method of claim 2, wherein the non-convex loss function includes a 0-1 loss function.

4. The method of claim 1, wherein the first noise-inducing function is:

$$\zeta_i = \mathcal{N}_{(0, 2\epsilon\beta^{-1})}$$

wherein: $\zeta_i$ is a given noise value to be added to $i^{th}$ estimated gradient value from the plurality of estimated gradient values to generate the $i^{th}$ noisy estimated gradient value from the first plurality of noisy estimated gradient values, $\mathcal{N}$ ("mean", "variance") is a normal distribution function, $\epsilon$ is a learning rate parameter, $\beta$ is an inverse Langevin diffusion temperature parameter.

5. The method of claim 1, wherein the generating the plurality of noisy candidate trees comprises:

generating, by the server, the given one of the plurality of noisy candidate trees by:

determining, by the server, a tree structure for the given one of the plurality of noisy candidate trees based on the first plurality of noisy estimated gradient values, the tree structure having the respective plurality of leaf nodes each of which corresponds to at least one of the first plurality of noisy estimated gradient values;

for a given leaf node corresponding to more than one of the first plurality of noisy estimated gradient values, aggregating, by the server, the more than one of the first plurality of noisy estimated gradient values, thereby determining an aggregated value;

using the aggregated value as the respective leaf value of the given leaf node; and for an other given leaf node of the respective plurality of leaf nodes corresponding to only one of the first plurality of noisy estimated gradient values, using the only one of the first plurality of noisy estimated gradient values as the respective leaf value.

6. The method of claim 1, wherein the selection metric is a sum of squared differences between the leaf values of a given noisy candidate tree and the corresponding estimated gradient values from the first plurality of estimated gradient values.

7. The method of claim 1, wherein the second noise-inducing function is:

$$\zeta_i' = \mathcal{N}_{(0, 2\epsilon\beta^{-1})}$$

wherein: $\zeta_i'$ is a given noise value to be added to $i^{th}$ estimated gradient value from the plurality of estimated gradient values to generate the $i^{th}$ noisy estimated gradient value from the second plurality of noisy estimated gradient values, $\mathcal{N}$ ("mean", "variance") is a normal distribution function, $\epsilon$ is a learning rate parameter, $\beta$ is an inverse Langevin diffusion temperature parameter.

8. The method of claim 1, wherein the first noise-inducing function is independent from the second noise-inducing function.

9. The method of claim 1, wherein the first plurality of noisy estimated gradient values are generated independently from the second plurality of noisy estimated gradient values.

10. The method of claim 1, wherein the generating the iteration-specific tree comprises:

for a given leaf node of the target tree corresponding to more than one of the second plurality of noisy estimated gradient values, aggregating, by the server, the more than one of the second plurality of noisy estimated gradient values, thereby determining an aggregated value;

using the aggregated value as the new leaf value of the given leaf node; and for an other given leaf node of the target tree corresponding to only one of the second plurality of noisy estimated gradient values, using the only one of the second plurality of noisy estimated gradient values to be used as the new leaf value of the other given leaf node.

11. The method of claim 1, wherein during the given training iteration, the method further comprises:

executing, by the server, a shrinkage procedure on the plurality of prediction values by using a shrinkage parameter for generating a plurality of shrunk prediction values, a given shrunk prediction value being smaller than the respective prediction value; and the given one from the plurality of estimated gradient values being indicative of a difference between the target value and a respective one of the plurality of shrunk prediction values.

12. The method of claim 1, wherein the using the iteration-specific tree in combination with the current plurality of generated trees comprises:

executing, by the server, a regularization procedure on the new leaf values of the iteration-specific tree by using a learning rate parameter for generating a plurality of regularized leaf values, a given regularized leaf value being smaller than the respective leaf value; and using, by the server, the iteration-specific tree with the plurality of regularized leaf values and the current plurality of generated trees during the next training iteration of the decision-tree based MLA.

13. A server for training a decision-tree based Machine Learning Algorithm (MLA) for providing search results in response to a query, the decision-tree based MLA being based on a plurality of generated trees, a given one from the plurality of generated trees having a respective plurality of leaf nodes having respective leaf values, the plurality of generated trees being trained to predict a relevancy of search results to the query the server having access to a training dataset, the training dataset comprising a plurality of training objects and a plurality of target values, a given one of the plurality of target values being indicative of a ground-truth associated with a given one of the plurality of training objects, each training object of the plurality of training objects comprising a query and a representation of a web page, the server being configured to:

during a given training iteration of the decision-tree based MLA:

generate a plurality of prediction values using a current plurality of generated trees, a given one from the plurality of prediction values being indicative of an output generated by the current plurality of generated trees for the target value of the respective one of the plurality of training objects;

generate a plurality of estimated gradient values by applying a loss function, a given one from the plurality of estimated gradient values being indicative of a difference between the target value and the respective one of the plurality of prediction values;

generate a first plurality of noisy estimated gradient values by applying a first noise-injecting function onto the plurality of estimated gradient values;

generate a plurality of noisy candidate trees using the first plurality of noisy estimated gradient values, a given one of the plurality of noisy candidate trees having a respective plurality of leaf nodes with respective leaf values, the respective leaf values being based on the first plurality of noisy estimated gradient values, apply a selection metric to the leaf values of the plurality of noisy candidate trees to select a target tree amongst the plurality of noisy candidate trees, the target tree being a given noisy candidate tree having leaf values that are closest to respective noisy estimated gradient values from the first plurality of noisy estimated gradient values than leaf values of any other noisy candidate tree;

generate a second plurality of noisy estimated gradient values by applying a second noise-injecting function onto the plurality of estimated gradient values;

generate an iteration-specific tree by determining new leaf values for respective leaf nodes of the target tree, the new leaf values being determined based on the second plurality of noisy estimated gradient values; and store the iteration-specific tree to be used, by the server, in combination with the current plurality of generated trees.

14. The server of claim 13, wherein the loss function is one of a convex loss function and a non-convex loss function.

15. The server of claim 14, wherein the non-convex loss function includes a 0-1 loss function.

16. The server of claim 13, wherein the first noise-inducing function is:

$$\zeta_i = \mathcal{N}(0, 2\epsilon\beta^{-1})$$

wherein: $\zeta_i$ is a given noise value to be added to $i^{th}$ estimated gradient value from the plurality of estimated gradient values to generate the $i^{th}$ noisy estimated gradient value from the first plurality of noisy estimated gradient values, $\mathcal{N}$ ("mean", "variance") is a normal distribution function, $\epsilon$ is a learning rate parameter, $\beta$ is an inverse Langevin diffusion temperature parameter.

17. The server of claim 13, wherein the server configured to generate the plurality of noisy candidate trees comprises the server being configured to:

generate the given one of the plurality of noisy candidate trees by:

determining, by the server, a tree structure for the given one of the plurality of noisy candidate trees based on the first plurality of noisy estimated gradient values, the tree structure having the respective plurality of leaf nodes each of which corresponds to at least one of the first plurality of noisy estimated gradient values;

for a given leaf node corresponding to more than one of the first plurality of noisy estimated gradient values, aggregating, by the server, the more than one of the first plurality of noisy estimated gradient values, thereby determining an aggregated value;

using the aggregated value as the respective leaf value of the given leaf node; and for an other given leaf node of the respective plurality of leaf nodes corresponding to only one of the first plurality of noisy estimated gradient values, using the only one of the first plurality of noisy estimated gradient values as the respective leaf value.

18. The server of claim 13, wherein the selection metric is a sum of squared differences between the leaf values of a given noisy candidate tree and the corresponding estimated gradient values from the first plurality of estimated gradient values.

\* \* \* \* \*